United States Patent
Khoshnevisan et al.

(10) Patent No.: US 12,302,358 B2
(45) Date of Patent: May 13, 2025

(54) CONDITIONS FOR SIMULTANEOUS PHYSICAL UPLINK SHARED CHANNEL TRANSMISSIONS

(71) Applicant: QUALCOMM Incorporated, San Diego, CA (US)

(72) Inventors: Mostafa Khoshnevisan, San Diego, CA (US); Yitao Chen, San Marcos, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/643,293

(22) Filed: Apr. 23, 2024

(65) Prior Publication Data
US 2024/0276509 A1  Aug. 15, 2024

Related U.S. Application Data

(63) Continuation of application No. 17/449,403, filed on Sep. 29, 2021, now Pat. No. 11,985,683.

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0048* (2013.01); *H04W 72/1268* (2013.01); *H04W 72/569* (2023.01)

(58) Field of Classification Search
None
See application file for complete search history.

(56) References Cited

U.S. PATENT DOCUMENTS 11,706,068 B2  7/2023  Yi et al.
2018/0359057 A1*  12/2018  Yang ............... H04L 1/1861
(Continued)

OTHER PUBLICATIONS

CATT: "Discussion on overlapping between CG PUSCH and DG PUSCH", 3GPP TSG RAN WG1 #104b-e, R1-2102592, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177238, 10 Pages, Sections 2.1 and 2.2.
(Continued)

*Primary Examiner* — Otis L Thompson, Jr.
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may receive, from a base station, an indication of uplink grants for physical uplink shared channel (PUSCH) messages, wherein the PUSCH messages include a first PUSCH message and a second PUSCH message that at least partially overlap in a time domain. The UE may transmit, to the base station, at least one of the first PUSCH message or the second PUSCH message based at least in part on one or more conditions for simultaneous PUSCH transmissions, wherein the one or more conditions are associated with at least one of: a resource alignment of the first PUSCH message and the second PUSCH message, or a demodulation reference signal (DMRS) alignment of the first PUSCH message and the second PUSCH message. Numerous other aspects are described.

20 Claims, 12 Drawing Sheets

(51) Int. Cl.
    *H04W 72/1268*     (2023.01)
    *H04W 72/566*     (2023.01)

(56) References Cited

U.S. PATENT DOCUMENTS

| | | | |
|---|---|---|---|
| 2018/0368176 A1* | 12/2018 | Sun | H04L 5/0055 |
| 2019/0313436 A1* | 10/2019 | Lee | H04L 5/0094 |
| 2020/0008158 A1* | 1/2020 | Yamamoto | H04W 72/0453 |
| 2020/0196302 A1 | 6/2020 | Takeda et al. | |
| 2021/0022132 A1 | 1/2021 | Park et al. | |
| 2021/0136565 A1 | 5/2021 | Saber et al. | |
| 2021/0175937 A1 | 6/2021 | Yamada et al. | |
| 2021/0282169 A1 | 9/2021 | Zhang et al. | |
| 2022/0086772 A1 | 3/2022 | Cozzo et al. | |
| 2022/0159683 A1 | 5/2022 | Islam et al. | |
| 2022/0183050 A1* | 6/2022 | Marco | H04L 1/1822 |
| 2022/0217726 A1* | 7/2022 | Koziol | H04W 72/53 |
| 2022/0287054 A1* | 9/2022 | Kim | H04L 5/0064 |
| 2022/0386355 A1* | 12/2022 | Yi | H04W 72/569 |
| 2023/0007547 A1 | 1/2023 | Jassal | |
| 2023/0100662 A1 | 3/2023 | Khoshnevisan et al. | |
| 2023/0224027 A1 | 7/2023 | Liu et al. | |
| 2023/0224099 A1 | 7/2023 | Chen et al. | |
| 2023/0231663 A1 | 7/2023 | Lunttila et al. | |
| 2023/0232445 A1 | 7/2023 | Marinier et al. | |
| 2023/0232453 A1 | 7/2023 | Iyer et al. | |

OTHER PUBLICATIONS

International Search Report and Written Opinion—PCT/US2022/041916—ISA/EPO—Nov. 21, 2022.

\* cited by examiner

CONDITIONS FOR SIMULTANEOUS PHYSICAL UPLINK SHARED CHANNEL TRANSMISSIONS

RELATED APPLICATION

This application is a continuation of U.S. patent application Ser. No. 17/449,403, entitled "CONDITIONS FOR SIMULTANEOUS PHYSICAL UPLINK SHARED CHANNEL TRANSMISSIONS," and filed Sep. 29, 2021, which is incorporated herein by reference in its entirety.

FIELD OF THE DISCLOSURE

Aspects of the present disclosure generally relate to wireless communication and to techniques and apparatuses for conditions for simultaneous physical uplink shared channel (PUSCH) transmissions.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a base station, an indication of uplink grants for physical uplink shared channel (PUSCH) messages, where the PUSCH messages include a first PUSCH message and a second PUSCH message that at least partially overlap in a time domain, and where the first PUSCH message and the second PUSCH message are associated with a same component carrier. The one or more processors may be configured to transmit, to the base station, at least one of the first PUSCH message or the second PUSCH message based at least in part on one or more conditions for simultaneous PUSCH transmissions, where the one or more conditions are associated with at least one of: a resource alignment of the first PUSCH message and the second PUSCH message, or a demodulation reference signal (DMRS) alignment of the first PUSCH message and the second PUSCH message.

Some aspects described herein relate to a base station for wireless communication. The base station may include a memory and one or more processors coupled to the memory. The one or more processors may be configured to transmit, to a UE, configuration information indicating one or more conditions for simultaneous PUSCH transmissions, where the one or more conditions are associated with at least one of: a resource alignment of the simultaneous PUSCH transmissions, or a DMRS alignment of the simultaneous PUSCH transmissions. The one or more processors may be configured to transmit, to the UE, an indication of uplink grants for PUSCH messages, where the PUSCH messages include a first PUSCH message and a second PUSCH message, where the first PUSCH message and the second PUSCH message at least partially overlap in a time domain, and where the two or more uplink grants are associated with a same component carrier. The one or more processors may be configured to receive, from the UE, at least one of the first PUSCH message or a second PUSCH message based at least in part on the one or more conditions.

Some aspects described herein relate to a method of wireless communication performed by a UE. The method may include receiving, from a base station, an indication of uplink grants for PUSCH messages, where the PUSCH messages include a first PUSCH message and a second PUSCH message that at least partially overlap in a time domain, and where the first PUSCH message and the second PUSCH message are associated with a same component carrier. The method may include transmitting, to the base station, at least one of the first PUSCH message or the second PUSCH message based at least in part on one or more conditions for simultaneous PUSCH transmissions, where the one or more conditions are associated with at least one of: a resource alignment of the first PUSCH message and the second PUSCH message, or a DMRS alignment of the first PUSCH message and the second PUSCH message.

Some aspects described herein relate to a method of wireless communication performed by a base station. The method may include transmitting, to a UE, configuration information indicating one or more conditions for simultaneous PUSCH transmissions, where the one or more conditions are associated with at least one of: a resource alignment of the simultaneous PUSCH transmissions, or a DMRS alignment of the simultaneous PUSCH transmissions. The method may include transmitting, to the UE, an indication of uplink grants for PUSCH messages, where the PUSCH messages include a first PUSCH message and a second PUSCH message, where the first PUSCH message and the second PUSCH message at least partially overlap in a time domain, and where the two or more uplink grants are associated with a same component carrier. The method may include receiving, from the UE, at least one of the first PUSCH message or a second PUSCH message based at least in part on the one or more conditions.

Some aspects described herein relate to a non-transitory computer-readable medium that stores a set of instructions for wireless communication by a UE. The set of instructions, when executed by one or more processors of the UE, may cause the UE to receive, from a base station, an indication of uplink grants for PUSCH messages, where the PUSCH messages include a first PUSCH message and a second PUSCH message that at least partially overlap in a time domain, and where the first PUSCH message and the second PUSCH message are associated with a same component carrier. The set of instructions, when executed by one or more processors of the UE, may cause the UE to transmit, to the base station, at least one of the first PUSCH message or the second PUSCH message based at least in part on one or more conditions for simultaneous PUSCH transmissions, where the one or more conditions are associated with at least one of a resource alignment of the first PUSCH message and the second PUSCH message, or a DMRS alignment of the first PUSCH message and the second PUSCH message.

Some aspects described herein relate to a non-transitory computer-readable medium that stores a set of instructions for wireless communication by a base station. The set of instructions, when executed by one or more processors of the base station, may cause the base station to transmit, to a UE, configuration information indicating one or more conditions for simultaneous PUSCH transmissions, where the one or more conditions are associated with at least one of: a resource alignment of the simultaneous PUSCH transmissions, or a DMRS alignment of the simultaneous PUSCH transmissions. The set of instructions, when executed by one or more processors of the base station, may cause the base station to transmit, to the UE, an indication of uplink grants for PUSCH messages, where the PUSCH messages include a first PUSCH message and a second PUSCH message, where the first PUSCH message and the second PUSCH message at least partially overlap in a time domain, and where the two or more uplink grants are associated with a same component carrier. The set of instructions, when executed by one or more processors of the base station, may cause the base station to receive, from the UE, at least one of the first PUSCH message or a second PUSCH message based at least in part on the one or more conditions.

Some aspects described herein relate to an apparatus for wireless communication. The apparatus may include means for receiving, from a base station, an indication of uplink grants for PUSCH messages, where the PUSCH messages include a first PUSCH message and a second PUSCH message that at least partially overlap in a time domain, and where the first PUSCH message and the second PUSCH message are associated with a same component carrier. The apparatus may include means for transmitting, to the base station, at least one of the first PUSCH message or the second PUSCH message based at least in part on one or more conditions for simultaneous PUSCH transmissions, where the one or more conditions are associated with at least one of: a resource alignment of the first PUSCH message and the second PUSCH message, or a DMRS alignment of the first PUSCH message and the second PUSCH message.

Some aspects described herein relate to an apparatus for wireless communication. The apparatus may include means for transmitting, to a UE, configuration information indicating one or more conditions for simultaneous PUSCH transmissions, where the one or more conditions are associated with at least one of: a resource alignment of the simultaneous PUSCH transmissions, or a DMRS alignment of the simultaneous PUSCH transmissions. The apparatus may include means for transmitting, to the UE, an indication of uplink grants for PUSCH messages, where the PUSCH messages include a first PUSCH message and a second PUSCH message, where the first PUSCH message and the second PUSCH message at least partially overlap in a time domain, and where the two or more uplink grants are associated with a same component carrier. The apparatus may include means for receiving, from the UE, at least one of the first PUSCH message or a second PUSCH message based at least in part on the one or more conditions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
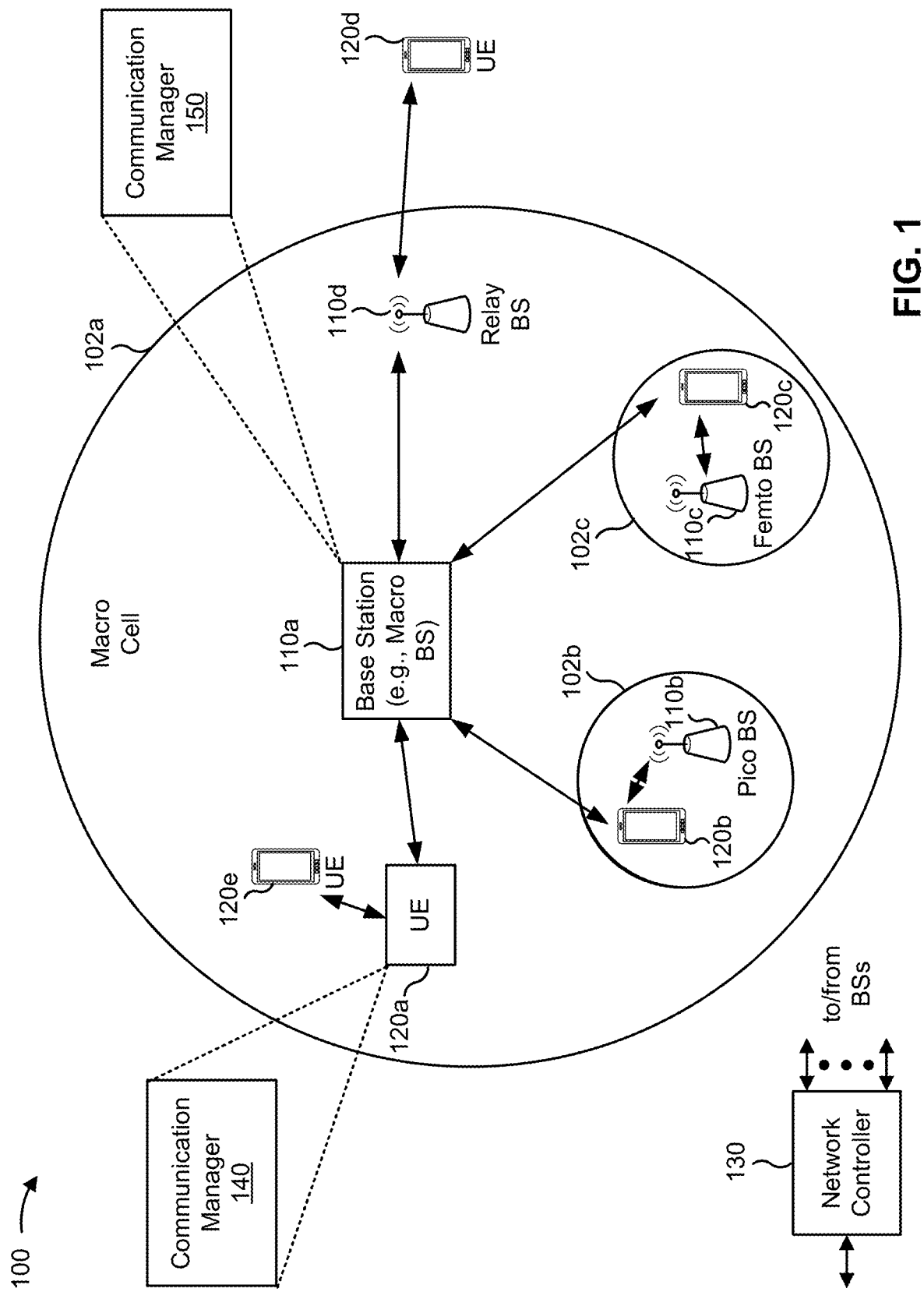
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, an indication of uplink grants for physical uplink shared channel (PUSCH) messages, wherein the PUSCH messages include a first PUSCH message and a second PUSCH message that at least partially overlap in a time domain, and wherein the first PUSCH message and the second PUSCH message are associated with a same component carrier; and transmit, to the base station, at least one of the first PUSCH message or the second PUSCH message based at least in part on one or more conditions for simultaneous PUSCH transmissions, wherein the one or more conditions are associated with at least one of: a resource alignment of the first PUSCH message and the second PUSCH message, or a demodulation reference signal (DMRS) alignment of the first PUSCH message and the second PUSCH message. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, configuration information indicating one or more conditions for simultaneous PUSCH transmissions, wherein the one or more conditions are associated with at least one of: a resource alignment of uplink grants of the simultaneous PUSCH transmissions, or a DMRS alignment of the uplink grants; transmit, to the UE, an indication of uplink grants for PUSCH messages, wherein the PUSCH messages include a first PUSCH message and a second PUSCH message, wherein the first PUSCH message and the second PUSCH message at least partially overlap in a time domain, and wherein the two or more uplink grants are associated with a same component carrier; and receive, from the UE, at least one of the first PUSCH message or a second PUSCH message based at least in part on the one or more conditions. Additionally, or alternatively, the communication manager 150 may perform one or more other operations described herein.

As indicated above, FIG. 1 is provided as an example. Other examples may differ from what is described with regard to FIG. 1.

Figure 2:
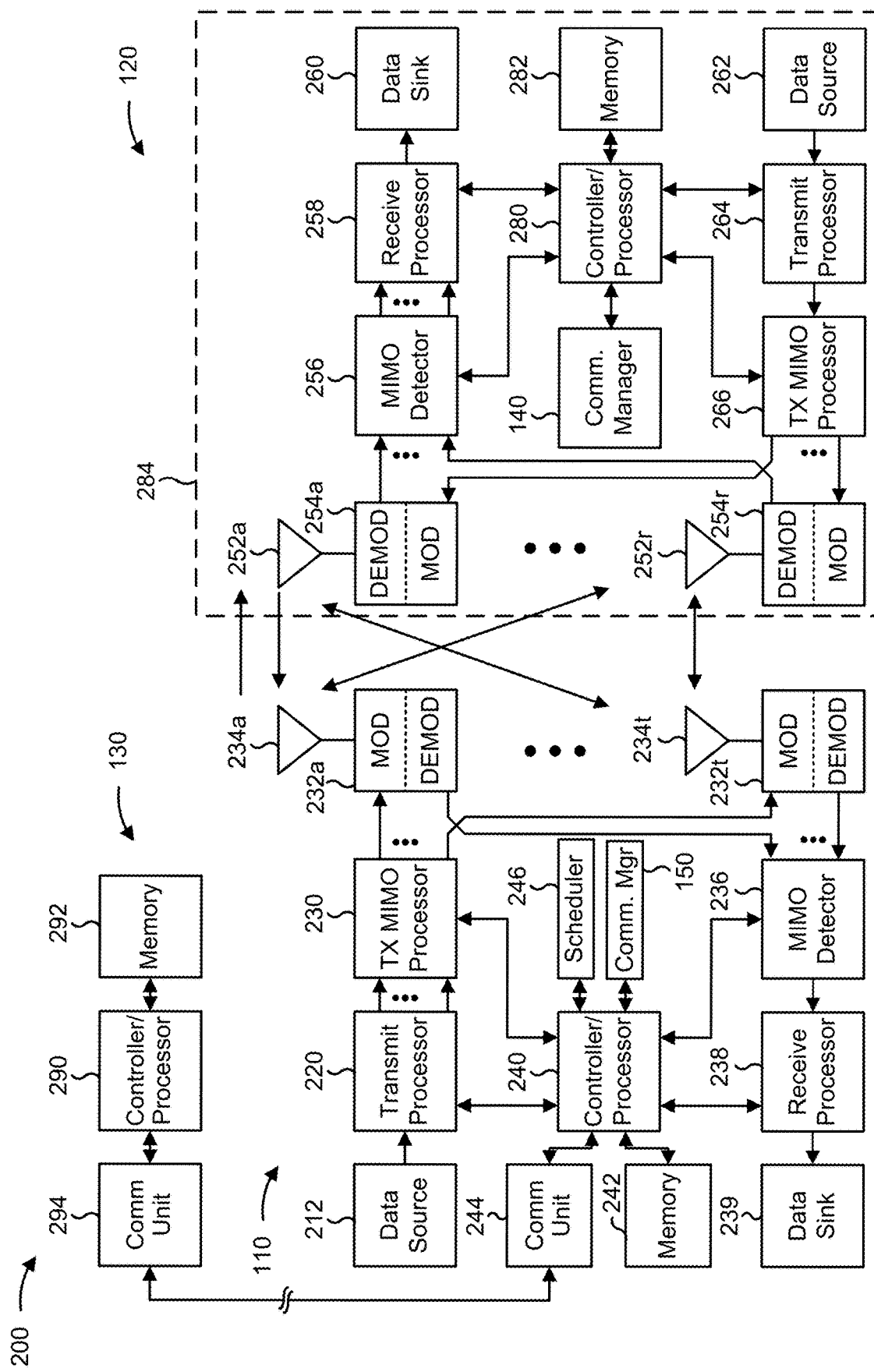
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232.

Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the base station 110, the controller/processor 280 of the UE 120, and/or any other component(s) of FIG. 2 may perform one or more techniques associated with conditions for simultaneous PUSCH transmissions, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving, from a base station, an indication of uplink grants for PUSCH messages, wherein the PUSCH messages include a first PUSCH message and a second PUSCH message that at least partially overlap in a time domain, and wherein the first PUSCH message and the second PUSCH message are associated with a same component carrier; and/or means for transmitting, to the base station, at least one of the first PUSCH message or the second PUSCH message based at least in part on one or more conditions for simultaneous PUSCH transmissions, wherein the one or more conditions are associated with at least one of: a resource alignment of the first PUSCH message and the second PUSCH message, or a DMRS alignment of the first PUSCH message and the second PUSCH message. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, configuration information indicating one or more conditions for simultaneous PUSCH transmissions, wherein the one or more conditions are associated with at least one of: a resource alignment of uplink grants of the simultaneous PUSCH transmissions, or a DMRS alignment of the uplink grants; means for transmitting, to the UE, an indication of uplink grants for PUSCH messages, wherein the PUSCH messages include a first PUSCH message and a second PUSCH message, wherein the first PUSCH message and the second PUSCH message at least partially overlap in a time domain, and wherein the two or more uplink grants are associated with a same component carrier; and/or means for receiving, from the UE, at least one of the first PUSCH message or a second PUSCH message based at least in part on the one or more conditions. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
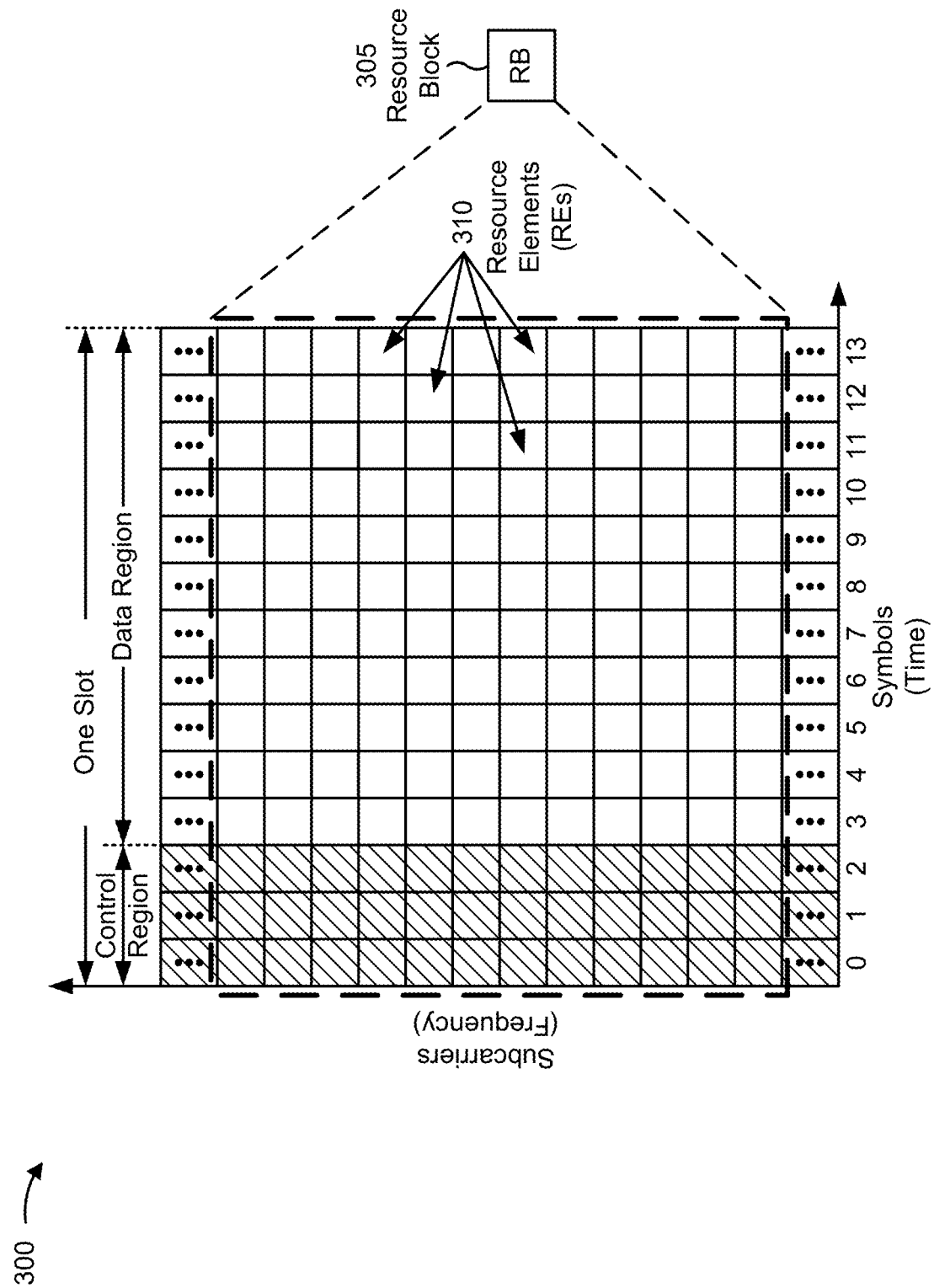
FIG. 3 is a diagram illustrating an example of a slot format, in accordance with the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some examples, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some examples, the link direction for a slot may be dynamically configured.

In some examples, a message may be associated with a grant. As used herein, "grant" may refer to an allocation of one or more time domain resources (e.g., one or more slots) and/or one or more frequency domain resources (e.g., REs or RBs) for a message. For example, an uplink message may be associated with an uplink grant that indicates, or defines, one or more time domain resources (e.g., one or more slots) and/or one or more frequency domain resources (e.g., REs or RBs) for the uplink message.

As indicated above, FIG. 3 is provided as an example. Other examples may differ from what is described with respect to FIG. 3.

Figure 4:
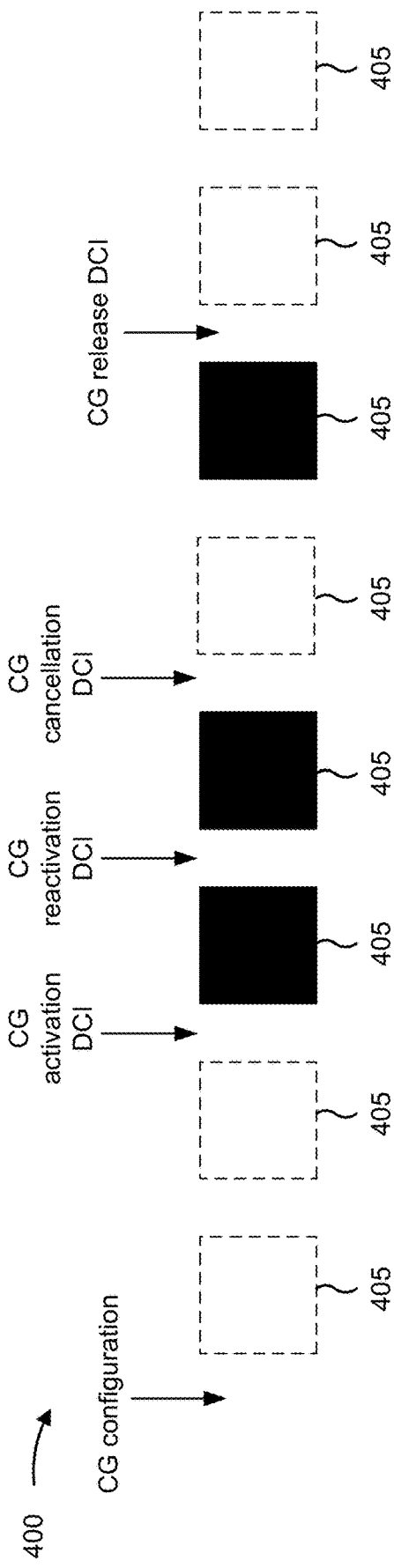
FIG. 4 is a diagram illustrating an example of uplink configured grant (CG) communication, in accordance with the present disclosure.

FIG. 4 is a diagram illustrating an example 400 of uplink configured grant (CG) communication, in accordance with the present disclosure. CG communications may include periodic uplink communications that are configured for a UE, such that the base station does not need to send separate downlink control information (DCI) to schedule each uplink communication, thereby conserving signaling overhead.

As shown in example 400, a UE may be configured with a CG configuration for CG communications. For example, the UE may receive the CG configuration via a radio resource control (RRC) message transmitted by a base station. The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 405 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The base station may transmit CG activation DCI to the UE to activate the CG configuration for the UE. The base station may indicate, in the CG activation DCI, communication parameters, such as an MCS, an RB allocation, and/or antenna ports, for the CG PUSCH communications to be transmitted in the scheduled CG occasions 405. The UE may begin transmitting in the CG occasions 405 based at least in part on receiving the CG activation DCI. For example, beginning with a next scheduled CG occasion 405 subsequent to receiving the CG activation DCI, the UE may transmit a PUSCH communication in the scheduled CG occasions 405 using the communication parameters indicated in the CG activation DCI. The UE may refrain from transmitting in configured CG occasions 405 prior to receiving the CG activation DCI.

The base station may transmit CG reactivation DCI to the UE to change the communication parameters for the CG PUSCH communications. Based at least in part on receiving the CG reactivation DCI, and the UE may begin transmitting in the scheduled CG occasions 405 using the communication parameters indicated in the CG reactivation DCI. For example, beginning with a next scheduled CG occasion 405 subsequent to receiving the CG reactivation DCI, the UE may transmit PUSCH communications in the scheduled CG occasions 405 based at least in part on the communication parameters indicated in the CG reactivation DCI.

In some cases, such as when the base station needs to override a scheduled CG communication for a higher priority communication, the base station may transmit CG cancellation DCI to the UE to temporarily cancel or deactivate one or more subsequent CG occasions 405 for the UE. The CG cancellation DCI may deactivate only a subsequent one CG occasion 405 or a subsequent N CG occasions 405 (where N is an integer). CG occasions 405 after the one or more (e.g., N) CG occasions 405 subsequent to the CG cancellation DCI may remain activated. Based at least in part on receiving the CG cancellation DCI, the UE may refrain from transmitting in the one or more (e.g., N) CG occasions 405 subsequent to receiving the CG cancellation DCI. As shown in example 400, the CG cancellation DCI cancels one subsequent CG occasion 405 for the UE. After the CG occasion 405 (or N CG occasions) subsequent to receiving the CG cancellation DCI, the UE may automatically resume transmission in the scheduled CG occasions 405.

The base station may transmit CG release DCI to the UE to deactivate the CG configuration for the UE. The UE may stop transmitting in the scheduled CG occasions 405 based at least in part on receiving the CG release DCI. For example, the UE may refrain from transmitting in any scheduled CG occasions 405 until another CG activation DCI is received from the base station. Whereas the CG cancellation DCI may deactivate only a subsequent one CG occasion 405 or a subsequent N CG occasions 405, the CG release DCI deactivates all subsequent CG occasions 405 for a given CG configuration for the UE until the given CG configuration is activated again by a new CG activation DCI.

Therefore, as described above, an uplink CG may indicate resources (e.g., frequency domain resources, time domain resources, and/or code domain resources) for uplink transmissions in advance (e.g., in the CG configuration and/or in an RRC configuration). This may differ from uplink communications that are dynamically granted (e.g., by a base station). For example, a "dynamic grant (DG)" uplink transmission may be associated with resources (e.g., frequency domain resources, time domain resources, and/or code domain resources) that are dynamically indicated or allocated, such as in a downlink control information (DCI) message. CGs may reduce signaling overhead because the base station may not be required to indicate the resources for an uplink transmission for each uplink transmission by the UE. DGs may provide more scheduling flexibility for the base station because the resources are dynamically allocated (e.g., rather than being allocated in advance, as is the case with CGs).

As indicated above, FIG. 4 is provided as an example. Other examples may differ from what is described with respect to FIG. 4.

In some cases, a UE may be scheduled and/or configured to simultaneously transmit two or more PUSCH messages. As used herein, "simultaneous" transmissions may refer to two or more transmissions that at least partially overlap in the time domain. In other words, two transmissions do not have to fully overlap in the time domain to be considered simultaneous transmissions. For example, two transmissions may be simultaneous transmissions if there is at least one symbol (e.g., one OFDM symbol) common to both transmissions. In some examples, the UE may receive uplink grants (e.g., one or more CGs and/or one or more DGs) that indicate resources (e.g., time domain resources and/or frequency domain resources) for PUSCH messages. In some cases, the resources for at least two PUSCH messages may overlap (e.g., in the time domain and/or the frequency domain). In some examples, the UE may be unable to transmit simultaneous PUSCH messages.

For example, the UE may use one or more common hardware components (e.g., one or more common radio frequency (RF) front end components) to transmit the simultaneous PUSCH messages. For example, the simultaneous PUSCH messages may be associated with the same component carrier, the same carrier, and/or the same (or similar)

carrier frequency. Therefore, the UE may use the same transmit chain, the same antenna panels, and/or the same antenna port(s), among other examples, to transmit the simultaneous PUSCH messages. In some cases, the UE may be capable of simultaneously transmitting PUSCH messages that use different antenna panels, that use different uplink beams, and/or that are associated with different control resource set (CORESET) pool index values, among other examples. However, in some cases, even if simultaneous PUSCH messages use different antenna panels and/or different uplink beams, the UE may be unable to transmit the simultaneous PUSCH messages based on a resource alignment and/or a DMRS alignment of the PUSCH messages.

As used herein, "resource alignment" may refer to an alignment of time domain resources and/or frequency domain resources of PUSCH messages. For example, based on RF requirements and/or a capability of the UE, the UE may not be capable of transmitting simultaneous PUSCH messages based on the resource alignment of the simultaneous PUSCH messages. For example, the UE may be unable to transmit simultaneous PUSCH messages that do not fully overlap in the time domain. If the UE is unable to, or is not capable of, transmitting the simultaneous PUSCH messages, then the UE may transmit only one of the PUSCH messages and/or may not transmit any of the simultaneous PUSCH messages. This may cause an increase in retransmissions for the UE (e.g., consuming additional resources), may result in one or more PUSCH messages being lost or not transmitted, and/or may cause delays in the PUSCH transmissions, among other examples.

As used herein, "DMRS alignment" may refer to alignment of resources (e.g., time domain resources and/or frequency domain resources) associated with DMRSs of PUSCH messages. For example, if DMRS resources (i.e., resources associated with a DMRS) of one PUSCH message overlap with DMRS resources or data resources (i.e., resources associated with data) of another PUSCH message, then channel estimation at a receiver (e.g., a base station or a TRP) may be degraded. A DMRS may carry information used to estimate a radio channel for demodulation of an associated physical channel. The design and mapping of a DMRS may be specific to a physical channel for which the DMRS is used for estimation. Therefore, if DMRS resources of one PUSCH message overlap with DMRS resources or data resources of another PUSCH message, then a receiver may be unable to perform channel estimation for the PUSCH and/or performance associated with the channel estimation for the PUSCH may be degraded.

Some techniques and apparatuses described herein enable simultaneous transmissions of PUSCH messages. For example, some techniques and apparatuses described herein are associated with simultaneous transmissions of PUSCH messages based at least in part on one or more conditions. The one or more conditions may be associated with a resource alignment of the simultaneous PUSCH messages and/or a DMRS alignment of the PUSCH messages. For example, a UE may be enabled to transmit simultaneous PUSCH messages based at least in part on the one or more conditions being met or satisfied, as described herein. In some aspects, the one or more conditions may be based at least in part on a capability of the UE and/or on a configuration transmitted by a base station. For example, the UE may indicate (e.g., via a UE capability message) whether the UE supports simultaneous transmissions of PUSCH messages in various circumstances. The base station may determine the one or more conditions based at least in part on the UE capability to support simultaneous transmissions of PUSCH messages. The base station may transmit, and the UE may receive, an RRC configuration indicating the one or more conditions associated with simultaneous transmissions of PUSCH messages.

Some techniques and apparatuses described herein further enable resolution handling for PUSCH messages that at least partially overlap in the time domain and that do not satisfy or meet the one or more conditions. For example, the UE may be enabled to transmit at least one PUSCH message, from two or more PUSCH messages that at least partially overlap in the time domain, when the two or more PUSCH messages do not satisfy or meet the one or more conditions described herein. For example, in some aspects, the UE may select two or more PUSCH messages, from three or more PUSCH messages that at least partially overlap in the time domain, based at least in part on a priority of the three or more PUSCH messages. The UE may determine if the one or more conditions are satisfied or met for the two or more PUSCH messages. In some other aspects, the UE may select one PUSCH message, from two or more PUSCH messages that at least partially overlap in the time domain. The UE may drop (e.g., not transmit) any PUSCH messages, from the two or more PUSCH messages, that do not satisfy or meet the one or more conditions with the selected PUSCH message. The UE may then transmit some (or all) of any remaining PUSCH messages, from the two or more PUSCH messages, that do satisfy or meet the one or more conditions with the selected PUSCH message. This may increase a likelihood that the UE is able to simultaneously transmit two or more PUSCH messages.

As a result, the UE may be enabled to simultaneously transmit two or more PUSCH messages. This may increase reliability of communications, may increase a throughput of the UE, may increase an efficiency (e.g., a spectral efficiency) of the UE, may conserve resources that would have otherwise been used to retransmit one or more of the overlapping PUSCH messages, and/or may decrease a latency or delay associated with the two or more PUSCH messages, among other examples. Additionally, channel estimation performed by a receiver (e.g., a base station or a TRP) may be improved because the UE may simultaneously transmit the two or more PUSCH messages based at least in part on a DMRS alignment of the two or more PUSCH messages. Moreover, the UE may be enabled to determine which (if any) PUSCH message(s) are to be transmitted when the one or more conditions (described herein) are not met or satisfied for PUSCH messages that at least partially overlap in the time domain. This may reduce the quantity of PUSCH retransmissions for the UE, may reduce delays in the PUSCH messages, and/or may increase a likelihood of the UE simultaneously transmitting PUSCH messages, among other examples.

Figure 5:
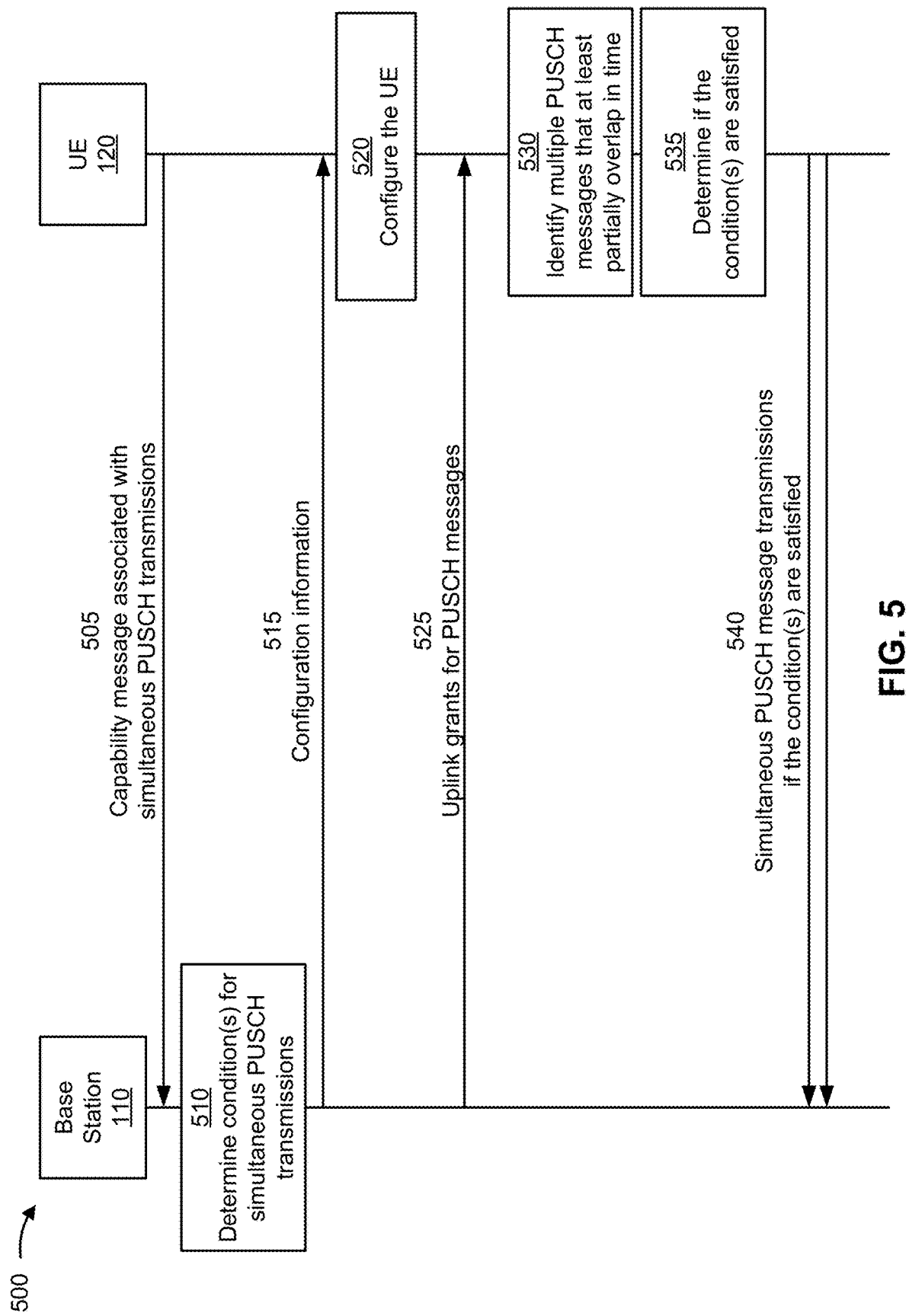
FIG. 5 is a diagram illustrating an example associated with conditions for simultaneous physical uplink shared channel (PUSCH) transmissions, in accordance with the present disclosure.

FIG. 5 is a diagram illustrating an example 500 associated with conditions for simultaneous PUSCH transmissions, in accordance with the present disclosure. As shown in FIG. 5, a base station 110 and a UE 120 may communicate with one another in a wireless network, such as the wireless network 100.

In some aspects, as shown by reference number 505, the UE 120 may transmit, and the base station 110 may receive, an indication of a capability of the UE 120 to support simultaneous PUSCH transmissions, as described herein. For example, the UE 120 may indicate a capability of the UE 120 to transmit simultaneous PUSCH transmissions in various circumstances. The UE 120 may transmit, and the base station 110 may receive, a capability message indicating conditions supported by the UE 120 for simultaneous PUSCH transmissions. For example, the UE 120 may indicate a capability of the UE 120 to relax or remove one or more conditions associated with simultaneous PUSCH transmissions. In other words, the UE 120 may indicate that the UE 120 is capable of simultaneously transmitting PUSCH messages even when one or more conditions (e.g., described in more detail elsewhere herein) are not met or satisfied. Additionally or alternatively, the UE 120 may indicate one or more conditions that are to be (or must be) satisfied for the UE to perform simultaneous PUSCH transmissions. As described in more detail elsewhere herein, the one or more conditions associated with simultaneous PUSCH transmissions may be based at least in part on a resource alignment of PUSCH messages and/or a DMRS alignment of the PUSCH messages. For example, the UE 120 may indicate that the UE 120 supports simultaneous transmission of PUSCH messages that at least partially overlap in the time domain (e.g., that are in the same component carrier) when the PUSCH messages partially overlap in the time domain, when the PUSCH messages overlap in both the time domain and the frequency domain, when the PUSCH messages are associated with non-contiguous frequency domain resources, and/or when the PUSCH messages are associated with partially overlapping REs, among other examples.

In some aspects, the UE 120 may transmit the indication via RRC signaling, medium access control (MAC) signaling (e.g., MAC control elements (MAC-CEs)), and/or a physical uplink control channel (PUCCH) message, among other examples. The UE 120 may transmit the indication in a UE capability message or a UE information message (e.g., a UE assistance information message).

As shown by reference number 510, the base station 110 may determine one or more conditions for simultaneous PUSCH transmissions. As used herein, "condition" for simultaneous PUSCH transmissions may refer to a state, a configuration, or a circumstance that is to be (or must be) present in order for the UE 120 to simultaneously transmit multiple PUSCH messages (e.g., that the PUSCH messages at least partially overlap in the time domain). In some aspects, the one or more conditions may be referred to as one or more restrictions (e.g., restrictions on simultaneous PUSCH transmissions) or one or more rules (e.g., rules for simultaneous PUSCH transmissions). The one or more conditions may be associated with resource alignments of PUSCH transmissions (e.g., PSUCH transmissions that at least partially overlap in the time domain) and/or DMRS alignments of the PUSCH transmissions, among other examples.

In some aspects, the base station 110 may determine the one or more conditions for simultaneous PUSCH transmissions based at least in part on a capability of the UE 120. For example, as described above, the UE 120 may transmit an indication of a capability of the UE 120 to support simultaneous PUSCH transmissions. The base station 110 may determine the one or more conditions based at least in part on condition(s) supported by the UE 120. In some aspects, the base station 110 may determine whether one or more conditions are to be configured for the UE 120 based at least in part on the capability of the UE 120. For example, if the UE 120 indicates that the UE 120 supports simultaneous PUSCH transmissions when the PUSCH messages are partially overlapping in the time domain, then the base station 110 may determine that a condition that indicates that PUSCH messages may be simultaneously transmitted if the PUSCH messages are fully overlapping in the time domain should not be configured for the UE 120.

In some aspects, the base station 110 may determine the one or more conditions based at least in part on pre-configured rules. For example, one or more conditions associated with simultaneous PUSCH transmissions may be defined, or otherwise fixed, by a wireless communication standard, such as the 3GPP. The base station 110 may identify the one or more conditions based at least in part on the pre-configured or pre-defined conditions. In some implementations, the base station 110 may determine the one or more conditions based at least in part on the pre-configured rules and the capability of the UE. For example, the pre-configured rules may indicate a default set of conditions for simultaneous PUSCH transmission and one or more conditions may be added to or removed from the default set of rules based on the capability of the UE to determine the one or more conditions that are to be satisfied for the UE to simultaneously transmit the PUSCH transmissions.

In some aspects, the base station 110 may determine the one or more conditions based at least in part on network conditions and/or network requirements. For example, the base station 110 may determine the one or more conditions based at least in part on channel estimation requirements of the base station 110. In some aspects, the base station 110 may determine one or more conditions associated with a DMRS alignment of PUSCH messages based at least in part on channel estimation requirements of the base station 110.

In some aspects, the base station 110 may determine the one or more conditions based at least in part on scheduling grants that have been configured for the UE 120. For example, if one or more CGs have been configured for the UE 120, then the base station 110 may determine that one or more conditions associated with simultaneous PUSCH transmissions are to be configured for the UE 120. For example, as described above (e.g., in connection with FIG. 4), the base station 110 may not dynamically schedule resources for CG uplink transmissions (e.g., the time domain resources and/or the frequency domain resources for CG uplink transmissions may be configured in an RRC configuration). Therefore, when CG uplink transmissions are configured for the UE 120, the base station 110 may not have full control to ensure that the conditions for simultaneous PUSCH transmissions are always met or satisfied. In other words, if no CG uplink transmissions are configured for the UE 120, the base station 110 may determine that one or more conditions may not be configured at the UE 120 because the base station 110 may schedule (e.g., dynamically) the PUSCH messages to satisfy or meet the one or more conditions described herein. Therefore, in some cases, the base station 110 may determine that the one or more conditions should be indicated to, or configured at, the UE 120 based at least in part on the UE 120 being configured with one or more uplink CGs.

As shown by reference number 515, the base station 110 may transmit, and the UE 120 may receive, configuration information. In some aspects, the UE 120 may receive configuration information from another device (e.g., from another base station or another UE). In some aspects, the UE 120 may receive the configuration information via RRC signaling and/or MAC signaling (e.g., MAC-CE signaling). In some aspects, the configuration information may include an indication of one or more configuration parameters (e.g., one or more configuration parameters that are pre-configured on the UE 120, such as in a original equipment manufacturer (OEM) configuration) for selection by the UE 120 and/or explicit configuration information for the UE 120 to use to configure itself.

In some aspects, the configuration information may indicate that the UE 120 is enabled to simultaneously transmit PUSCH messages. In some aspects, the configuration information may indicate that the UE 120 is enabled to simultaneously transmit PUSCH messages if one or more conditions are satisfied. For example, the base station 110 may transmit, and the UE 120 may receive, configuration information indicating the one or more conditions. For example, the base station 110 may configure the UE 120 with the one or more conditions (e.g., the conditions determined by the base station 110). In some aspects, as described above, the one or more conditions may be based at least in part on the capability of the UE 120 (e.g., the UE 120 may receive the configuration information indicating the one or more conditions based at least in part on the UE 120 transmitting the capability message).

In some other aspects, the one or more conditions may not be indicated by the base station 110. For example, the one or more conditions associated with simultaneous PUSCH transmissions may be pre-configured at the UE 120. For example, the one or more conditions associated with simultaneous PUSCH transmissions may be defined, or otherwise fixed, by a wireless communication standard, such as the 3GPP. Therefore, in some cases, the base station 110 may not transmit, and the UE 120 may not receive, an indication of the one or more conditions.

In some aspects, the one or more conditions may be associated with a resource alignment of PUSCH messages that at least partially overlap in the time domain. For example, the one or more conditions may be associated with a resource overlapping type (e.g., a type of overlap among the resources of the PUSCH messages).

For example, in some aspects, the one or more conditions associated with the resource alignment of PUSCH messages (e.g., a first PUSCH message and a second PUSCH message) may include a condition indicating that a first PUSCH message and a second PUSCH message are simultaneously transmitted (e.g., by the UE 120) based at least in part on time domain resources of the first PUSCH message fully overlapping with time domain resources of the second PUSCH message. In other words, the condition may indicate that two PUSCH messages are not to be simultaneously transmitted if the two PUSCH messages are partially overlapping in the time domain. For example, the condition may indicate that if two or more PUSCH messages are overlapping in the time domain, then the two or more PUSCH messages should be fully overlapping in the time domain (e.g., should occupy the same set of OFDM symbols) to be simultaneously transmitted by the UE 120. For example, if time domain resources scheduled for the first PUSCH message fully overlap with time domain resources scheduled for the second PUSCH message (e.g., the condition is satisfied), then the UE 120 may simultaneously transmit the first PUSCH message and the second PUSCH message. On the other hand, if time domain resources scheduled for the first PUSCH message do not overlap or only partially overlap with time domain resources scheduled for the second PUSCH message (e.g., the condition is not satisfied), then the UE 120 does not simultaneously transmit the first PUSCH message and the second PUSCH message.

In some aspects, the one or more conditions associated with the resource alignment of PUSCH messages (e.g., a first PUSCH message and a second PUSCH message) may include a condition indicating that a first PUSCH message and a second PUSCH message are simultaneously transmitted (e.g., by the UE 120) based at least in part on frequency domain resources of the first PUSCH message not overlapping with frequency domain resources of the second PUSCH message. In other words, the condition may indicate that the UE 120 is not to simultaneously transmit two or more PUSCH messages if the two or more PUSCH messages are overlapping in both time domain resources and frequency domain resources (e.g., a restriction of simultaneous PUSCH transmissions may be that the two or more PUSCH messages are not overlapping in resources and/or REs in both the time domain and the frequency domain). For example, if time domain resources scheduled for the first PUSCH message at least partially overlap with time domain resources scheduled for the second PUSCH message and frequency domain resources scheduled for the first PUSCH message do not overlap with frequency domain resources scheduled for the second PUSCH message (e.g., the condition is satisfied), then the UE 120 may simultaneously transmit the first PUSCH message and the second PUSCH message. However, if time domain resources scheduled for the first PUSCH message at least partially overlap with time domain resources scheduled for the second PUSCH message and frequency domain resources scheduled for the first PUSCH message at least partially overlap with frequency domain resources scheduled for the second PUSCH message (e.g., the condition is not satisfied), then the UE 120 does not simultaneously transmit the first PUSCH message and the second PUSCH message.

In some aspects, the one or more conditions associated with the resource alignment of PUSCH messages (e.g., a first PUSCH message and a second PUSCH message) may include a condition indicating that a first PUSCH message and a second PUSCH message are simultaneously transmitted based at least in part on frequency domain resources of the first PUSCH message being contiguous with frequency domain resources of the second PUSCH message. "Contiguous" frequency domain resources may refer to a first set of frequency domain resources and a second set of frequency domain resources that do not overlap (e.g., in the frequency domain such that are no common RBs among the first set of frequency domain resources and the second set of frequency domain resources) and that have no frequency domain resources (e.g., no RBs) between the first set of frequency domain resources and the second set of frequency domain resources. In other words, contiguous frequency domain resources may be adjoining or adjacent frequency domain resources (e.g., that do not overlap). For example, a condition for simultaneous PUSCH transmissions may indicate that two PUSCH messages may be simultaneously transmitted if the frequency domain resource allocations of the two PUSCH messages are adjacent to each other (e.g., when the two PUSCH messages are overlapping in the time domain and non-overlapping in the frequency domain). For example, if frequency domain resources scheduled for a first PUSCH message are contiguous or adjacent with frequency domain resources scheduled for a second PUSCH message (e.g., the condition is satisfied), then the UE 120 may simultaneously transmit the first PUSCH message and the second PUSCH message. On the other hand, if the frequency domain resources scheduled for the first PUSCH message are not contiguous or not adjacent with frequency domain resources scheduled for the second PUSCH message (e.g., the condition is not satisfied), then the UE 120 does not simultaneously transmit the first PUSCH message and the second PUSCH message.

In some aspects, the one or more conditions associated with the resource alignment of PUSCH messages (e.g., a first PUSCH message and a second PUSCH message) may include a condition indicating that a first PUSCH message and a second PUSCH message are simultaneously transmitted based at least in part on the first PUSCH message and the second PUSCH message being associated with a same one or more DMRS ports. "DMRS port" may refer to an antenna port associated with the DMRS. The condition may indicate that two or more PUSCH messages may be simultaneously transmitted if the two or more PUSCH messages are associated with the same DMRS port(s). For example, if a first DMRS port associated with a first PUSCH message is the same as a second DMRS port associated with a second PUSCH message (e.g., the condition is satisfied), then the UE 120 may simultaneously transmit the first PUSCH message and the second PUSCH message. However, if the first DMRS port associated with the first PUSCH message is different than the second DMRS port associated with a second PUSCH message (e.g., the condition is not satisfied), then the UE 120 does not simultaneously transmit the first PUSCH message and the second PUSCH message.

In some aspects, the one or more conditions associated with the resource alignment of PUSCH messages (e.g., a first PUSCH message and a second PUSCH message) may include a condition indicating that a first PUSCH message and a second PUSCH message are simultaneously transmitted based at least in part on the first PUSCH message and the second PUSCH message being associated with a same one or more PUSCH ports. "PUSCH port" may refer to an antenna port associated with the PUSCH. The condition may indicate that two or more PUSCH messages may be simultaneously transmitted if two or more PUSCH messages are associated with the same PUSCH port(s). For example, if a first PUSCH port associated with a first PUSCH message is the same as a second PUSCH port associated with a second PUSCH message (e.g., the condition is satisfied), then the UE 120 may simultaneously transmit the first PUSCH message and the second PUSCH message. However, if the first PUSCH port associated with the first PUSCH message is different than the second PUSCH port associated with a second PUSCH message (e.g., the condition is not satisfied), then the UE 120 does not simultaneously transmit the first PUSCH message and the second PUSCH message.

In some aspects, the one or more conditions associated with the resource alignment of PUSCH messages (e.g., a first PUSCH message and a second PUSCH message) may include a condition indicating that a first PUSCH message and a second PUSCH message are simultaneously transmitted based at least in part on the first PUSCH message and the second PUSCH message being associated with a same one or more power control parameters. A power control parameter may include a transmit power, a maximum transmit power, and/or a power control adjustment parameter, among other examples. The condition may indicate that two or more PUSCH messages may be simultaneously transmitted if two or more PUSCH messages are associated with the same power control parameter(s). For example, if a first one or more power control parameters associated with a first PUSCH message are the same as a second one or more power control parameters associated with a second PUSCH message (e.g., the condition is satisfied), then the UE 120 may simultaneously transmit the first PUSCH message and the second PUSCH message. On the other hand, if the first one or more power control parameters associated with the first PUSCH message are different than the second one or more power control parameters associated with a second PUSCH message (e.g., the condition is not satisfied), then the UE 120 does not simultaneously transmit the first PUSCH message and the second PUSCH message.

In some aspects, the one or more conditions associated with the resource alignment of PUSCH messages (e.g., a first PUSCH message and a second PUSCH message) may include a condition indicating that a first PUSCH message and a second PUSCH message are simultaneously transmitted based at least in part on resource elements of the first PUSCH message fully overlapping with resource elements of the second PUSCH message. For example, the condition may indicate that two or more PUSCH messages may be simultaneously transmitted based at least in part on REs of the two or more PUSCH messages not partially overlapping. In other words, if the two or more PUSCH messages share a common RE, then the two or more PUSCH messages should occupy the same set of REs to be simultaneously transmitted by the UE 120. For example, if a first one or more REs associated with a first PUSCH message fully overlap with (e.g., are the same as) a second one or more REs associated with a second PUSCH message (e.g., the condition is satisfied), then the UE 120 may simultaneously transmit the first PUSCH message and the second PUSCH message. However, if the first one or more REs associated with the first PUSCH message are partially overlapping (e.g., have at least one different RE) with the second one or more REs associated with a second PUSCH message (e.g., the condition is not satisfied), then the UE 120 does not simultaneously transmit the first PUSCH message and the second PUSCH message.

In some aspects, one or more of the conditions described above (and/or a combination of one or more of the conditions described above) may enable the UE 120 to use common RF front end components (e.g., hardware components) to simultaneously transmit PUSCH messages. For example, if each condition, included in a combination of one or more of the conditions described above, is satisfied, then the UE 120 may simultaneously transmit two or more PUSCH messages using common RF front end components (e.g., hardware components). For example, if two or more PUSCH messages are fully overlapping in the time domain, do not overlap in the frequency domain, have contiguous frequency domain resources, share the same DMRS port(s), share the same PUSCH port(s), and/or share the same power control parameter(s), then the UE 120 may simultaneously transmit the two or more PUSCH messages using the same RF hardware components for each PUSCH message. For example, if the one or more of the conditions are satisfied, then the UE 120 may simultaneously transmit multiple PUSCH messages using the same power amplifier. Using common RF front end components may ensure that the UE 120 is able to simultaneously transmit PUSCH messages because the UE 120 is not required to switch between RF front end components and/or to use multiple different sets of RF front end components to simultaneously transmit PUSCH messages.

In some aspects, a condition may be associated with a DMRS alignment of PUSCH messages that at least partially overlap in the time domain. For example, a condition may be associated with an alignment of resources associated with a DMRS for a first PUSCH message and resources associated with a DMRS for a second PUSCH message (e.g., where the first PUSCH message and the second PUSCH message at least partially overlap in the time domain).

For example, the one or more conditions associated with a DMRS alignment of the PUSCH messages (e.g., a first PUSCH message and a second PUSCH message) may include a condition indicating that the first PUSCH message and the second PUSCH message are simultaneously transmitted based at least in part on the first PUSCH message and the second PUSCH message being associated with a same one or more DMRS symbol locations and/or a same DMRS configuration type. In some aspects, a condition may indicate that the first PUSCH message and the second PUSCH message are simultaneously transmitted based at least in part on the first PUSCH message and the second PUSCH message being associated with both a same one or more DMRS symbol locations and a same DMRS configuration type. "DMRS symbol location" may refer to a symbol in a slot that is associated with the DMRS (e.g., a symbol in which REs associated with the DMRS are located). The DMRS symbol locations may be based at least in part on a PUSCH mapping type. For example, in a PUSCH mapping Type A, the DMRS may be mapped to a third and/or fourth symbol of a slot. In a PUSCH mapping Type B, the DMRS may be mapped to a first symbol of a slot. The PUSCH mapping types may be defined, or otherwise fixed, by a wireless communication standard, such as the 3GPP. For example, if a first one or more symbol locations for a DMRS associated with a first PUSCH message are the same as a second one or more symbol locations for a DMRS associated with a second PUSCH message (e.g., the condition is satisfied), then the UE 120 may simultaneously transmit the first PUSCH message and the second PUSCH message. However, if the first one or more symbol locations for a DMRS associated with the first PUSCH message are different than the second one or more symbol locations for a DMRS associated with the second PUSCH message (e.g., the condition is not satisfied), then the UE 120 does not simultaneously transmit the first PUSCH message and the second PUSCH message. This may ensure that a DMRS of one PUSCH message does not overlap with data REs of another PUSCH message when the PUSCH messages are simultaneously transmitted (e.g., thereby improving channel estimation performance at the base station 110).

"DMRS configuration type" may refer to a configuration type for a PUSCH message indicated by the base station 110. A DMRS configuration type may indicate or define a subcarrier or RE mapping for the DMRS. For example, for a DMRS configuration Type 1, the DMRS may be associated with alternating subcarrier or RE mappings. For a DMRS configuration Type 2, the DMRS may be associated with contiguous subcarrier or RE mappings. The DMRS configuration types may be defined, or otherwise fixed, by a wireless communication standard, such as the 3GPP. For example, if a first DMRS configuration type associated with a first PUSCH message is the same as a second DMRS configuration type associated with a second PUSCH message (e.g., the condition is satisfied), then the UE 120 may simultaneously transmit the first PUSCH message and the second PUSCH message. On the other hand, if the first DMRS configuration type associated with the first PUSCH message is different than the second DMRS configuration type associated with the second PUSCH message (e.g., the condition is not satisfied), then the UE 120 does not simultaneously transmit the first PUSCH message and the second PUSCH message. This may ensure that a DMRS of one PUSCH message does not overlap with data REs of another PUSCH message when the PUSCH messages are simultaneously transmitted (e.g., thereby improving channel estimation performance at the base station 110).

In some aspects, the one or more conditions associated with a DMRS alignment of the PUSCH messages (e.g., a first PUSCH message and a second PUSCH message) may include a condition indicating that a first PUSCH message and a second PUSCH message are simultaneously transmitted based at least in part on a first code division multiplex (CDM) group (e.g., a first DMRS CDM group) associated with the first PUSCH message being different than a second CDM group (e.g., a second DMRS CDM group) associated with the second PUSCH message. For example, multiple DMRS ports can be used to transmit on the same OFDM symbol using CDM and frequency division multiplexing (FDM). Using FDM, different DMRS ports can be used for transmission of DMRSs on the same OFDM symbol by using different subcarriers (e.g., tones) for different DMRS ports. Using CDM, different DMRS ports can be used for transmission of DMRSs on the same OFDM symbol (or across a set of OFDM symbols on the same subcarrier) by using different orthogonal cover codes (OCCs) for different DMRS ports. The DMRS ports that are used for transmission on the same sub-carrier belong to the same CDM group, and the DMRS ports that are used for transmission on different sub-carriers belong to different CDM groups. In other words, a CDM group includes a set of DMRS ports used for transmission of a respective set of DMRSs on the same subcarrier, where different OCCs are used for (e.g., to scramble) transmissions on different DMRS ports included in the set of DMRS ports.

The maximum number of CDM groups that are supported for one symbol may depend on a DMRS configuration for that symbol (or the resource block that includes the symbol). The DMRS configuration may dictate a maximum number of DMRS ports that can be used for DMRS transmission on a single symbol. As an example, a first type of DMRS configuration (e.g., DMRS configuration type 1) may support a maximum of two CDM groups per symbol. In this configuration, a first CDM group may occupy a first set of subcarriers on a symbol, such as even subcarriers, and a second CDM group may occupy a second set of subcarriers on the symbol, such as odd subcarriers. As another example, a second type of DMRS configuration (e.g., DMRS configuration type 2) may support a maximum of three CDM groups per symbol. In this configuration, a first CDM group may occupy a first set of subcarriers on a symbol, a second CDM group may occupy a second set of subcarriers on the symbol, and a third CDM group may occupy a third set of subcarriers on the symbol.

For example, a condition may indicate that a first PUSCH message and a second PUSCH message that at least partially overlap in the time domain may be simultaneously transmitted by the UE 120 if the DMRS CDM group(s) of the DMRS ports of the first PUSCH message are different than the DMRS CDM group(s) of the DMRS ports of the second PUSCH message. For example, if a first one or more DMRS groups associated with a first PUSCH message are different than a second one or more DMRS CDM groups associated with a second PUSCH message (e.g., the condition is satisfied), then the UE 120 may simultaneously transmit the first PUSCH message and the second PUSCH message. On the other hand, if the first one or more DMRS CDM groups associated with the first PUSCH message are the same as the second one or more DMRS CDM groups associated with the second PUSCH message (e.g., the condition is not satisfied), then the UE 120 does not simultaneously transmit the first PUSCH message and the second PUSCH message. This may ensure that REs associated with DMRSs of the two PUSCH messages do not overlap (e.g., thereby improving channel estimation performance at the base station 110).

In some aspects, the one or more conditions associated with a DMRS alignment of the PUSCH messages (e.g., a first PUSCH message and a second PUSCH message) may include a condition indicating that a first PUSCH message and a second PUSCH message are simultaneously transmitted based at least in part on data associated with one PUSCH message, of the first PUSCH message and the second PUSCH message, not occupying resources associated with a DMRS CDM group of another PUSCH message of the first PUSCH message and the second PUSCH message. In other words, a condition may indicate that PUSCH messages may be simultaneously transmitted by the UE 120 if there is no data for one PUSCH message in REs associated with a CDM group occupied by DMRS ports of another PUSCH message. This may ensure that REs associated with data of one PUSCH message do not collide with, or occupy the same, REs associated with a DMRS of another PUSCH message (e.g., thereby improving channel estimation performance at the base station 110). For example, if a first one or more REs associated with data for a first PUSCH message do not overlap with a second one or more REs associated with a DMRS CDM group for a second PUSCH message (e.g., the condition is satisfied), then the UE 120 may simultaneously transmit the first PUSCH message and the second PUSCH message. However, if the first one or more REs associated with data for a first PUSCH message at least partially overlap with the second one or more REs (e.g., the first one or more REs and the second one or more REs include at least one common RE) associated with a DMRS CDM group for a second PUSCH message (e.g., the condition is not satisfied), then the UE 120 does not simultaneously transmit the first PUSCH message and the second PUSCH message.

In some aspects, any combination of the conditions described above may be determined by the base station 510 as required to be satisfied for the UE to simultaneously transmit PUSCH transmissions. The combination may include all the conditions described above or a subset of the conditions described above. In some examples, if more than one condition is required to be satisfied for the UE to simultaneously transmit the PUSCH transmissions, then all of the required conditions must be satisfied for the UE to simultaneously transmit the PUSCH transmissions.

In some aspects, the base station 110 may transmit, and the UE 120 may receive, an indication of the one or more conditions for simultaneous PUSCH transmissions. In some aspects, the indication of the one or more conditions for simultaneous PUSCH transmissions may be included in the configuration information. In some other aspects, the indication of the one or more conditions for simultaneous PUSCH transmissions may be included in another message, such as a MAC-CE message. For example, an RRC configuration may configure a set of conditions and a MAC-CE message may indicate a subset of conditions, from the set of conditions, to be used or applied by the UE 120.

As shown by reference number 520, the UE 120 may configure the UE 120 for communicating with the base station 110. In some aspects, the UE 120 may configure the UE 120 based at least in part on the configuration information. In some aspects, the UE 120 may be configured to perform one or more operations described herein. For example, the UE 120 may configure itself to determine if the one or more conditions associated with simultaneous PUSCH transmissions are satisfied (e.g., as described in more detail elsewhere herein) prior to transmitting two or more PUSCH messages that at least partially overlap in the time domain. As described elsewhere herein, the one or more conditions may be indicated by the base station 110 (e.g., in the configuration information) and/or may be pre-configured at the UE 120 (e.g., based at least in part on condition(s) defined by a wireless communication standard). For example, in some aspects, condition(s) indicated via the configuration information may override or replace condition(s) pre-configured at the UE 120. In some aspects, one or more conditions pre-configured at the UE 120 may be disabled by an indication included in the configuration information. The UE 120 may be configured to monitor the one or more conditions to determine whether to simultaneously transmit PUSCH messages.

As shown by reference number 525, the base station 110 may transmit, and the UE 120 may receive, an indication of uplink grants for PUSCH messages. The uplink grants may indicate resources (e.g., time domain resources and/or frequency domain resources) for the PUSCH messages. The uplink grants may be uplink CGs and/or uplink DGs. For example, the base station 110 may transmit an indication of one or more uplink CGs via an RRC configuration (e.g., and the one or more uplink CGs may be activated via a DCI message, as explained in more detail elsewhere herein). As another example, the base station 110 may transmit DCI indicating resources (e.g., time domain resources and/or frequency domain resources) for a PUSCH message. The base station 110 may transmit, and the UE 120 may receive, multiple messages and/or different messages indicating the uplink grants.

As shown by reference number 530, the UE 120 may identify multiple PUSCH messages that at least partially overlap in the time domain. For example, the PUSCH messages scheduled by the uplink grants may include two or more PUSCH messages that at least partially overlap in the time domain. For example, the PUSCH messages scheduled by the uplink grants may include a first PUSCH message and a second PUSCH message that at least partially overlap in the time domain. Additionally, the two or more PUSCH messages that at least partially overlap in the time domain may be associated with a same component carrier.

As shown by reference number 535, the UE 120 may determine if the one or more conditions associated with simultaneous PUSCH transmissions are satisfied for the two or more PUSCH messages that at least partially overlap in the time domain. For example, the UE 120 may determine if one or more of the conditions described above are satisfied. Additionally, or alternatively, the UE 120 may determine if all of the conditions for simultaneous PUSCH transmissions (e.g., all of the required conditions determined at reference number 540) are satisfied. The UE 120 may determine if a resource alignment and/or a DMRS alignment of the two or more PUSCH messages satisfy the one or more conditions.

For example, the UE 120 may determine whether time domain resources for a first PUSCH message partially overlap with time domain resources of a second PUSCH message. As another example, the UE 120 may determine whether resources for the first PUSCH message and resources for the second PUSCH message overlap in both the time domain and the frequency domain. As another example, the UE 120 may determine whether frequency domain resources of the first PUSCH message are contiguous with frequency domain resources of the second PUSCH message. In some aspects, the UE 120 may determine whether REs associated with the first PUSCH message partially overlap with REs associated with the second PUSCH message.

In some aspects, the UE 120 may determine whether the first PUSCH message and the second PUSCH message are associated with the same one or more DMRS symbol locations and/or the same DMRS configuration type. As another example, the UE 120 may determine whether the first PUSCH message and the second PUSCH message are associated with the same DMRS CDM group(s). As another example, the UE 120 may determine whether data associated with the first PUSCH message is occupying REs associated with a DMRS CDM group of the second PUSCH message.

The UE 120 may determine whether the condition(s) are satisfied as described in more detail elsewhere herein. As shown by reference number 540, the UE 120 may transmit, and the base station 110 may receive, two or more PUSCH messages that at least partially overlap in the time domain based at least in part on the one or more conditions being satisfied. For example, if the one or more conditions are satisfied, then the UE 120 may simultaneously transmit a first PUSCH message and a second PUSCH message. On the other hand, if at least one condition, of the one or more conditions, is not satisfied, then the UE 120 may transmit one PUSCH message of the two or more PUSCH messages that at least partially overlap in the time domain. A determination of which PUSCH message to transmit when at least one condition, of the one or more conditions, is not satisfied is depicted and described in more detail in connection with FIGS. 7 and 8.

Based at least in part on the resource alignment and/or the DMRS alignment of the PUSCH messages, the UE 120 may be enabled to simultaneously transmit the PUSCH messages. For example, by considering the resource alignment when determining whether to simultaneously transmit PUSCH messages, the UE 120 may ensure that RF requirements and/or a capability of the UE 120 are complied with. Additionally, by considering the DMRS alignment when determining whether to simultaneously transmit PUSCH messages, the UE 120 may increase the likelihood that the base station 110 is enabled to properly and/or successfully receive and decode the DMRSs of the PUSCH messages. This may increase the reliability of communications and a channel estimation performance by the base station 110 for the PUSCH.

As indicated above, FIG. 5 is provided as an example. Other examples may differ from what is described with respect to FIG. 5.

Figure 6:
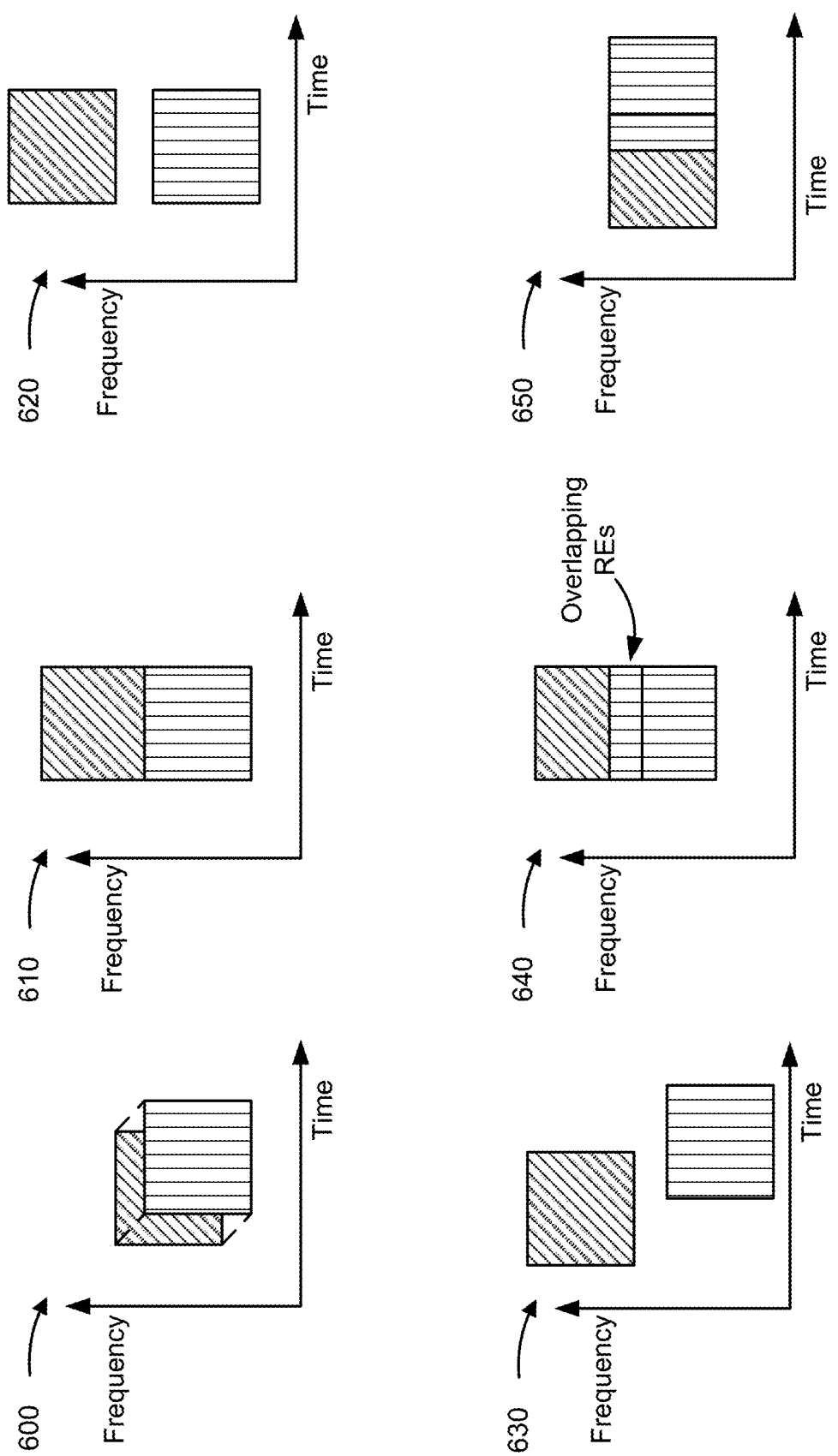
FIG. 6 is a diagram illustrating examples associated with resource alignments for simultaneous PUSCH transmissions, in accordance with the present disclosure.

FIG. 6 is a diagram illustrating examples 600, 610, 620, 630, 640, and 650 associated with resource alignments for simultaneous PUSCH transmissions, in accordance with the present disclosure. The examples depicted in FIG. 6 may include a first PUSCH message and a second PUSCH message that at least partially overlap in the time domain. The resources for the first PUSCH message and the resources for the second PUSCH message may be indicated by uplink grants (e.g., uplink CGs or uplink DGs). A UE 120 may determine whether the resources for the first PUSCH message and the resources for the second PUSCH message satisfy one or more conditions prior to simultaneously transmitting the first PUSCH message and the second PUSCH message, as described in connection with FIG. 5.

The one or more conditions associated with the resource alignment of PUSCH messages that at least partially overlap in the time domain may include a first condition indicating that the first PUSCH message and the second PUSCH message may be simultaneously transmitted if the time domain resources of the first PUSCH message and the time domain resources of the second PUSCH message fully overlap (e.g., if the first PUSCH message and the second PUSCH message occupy the same one or more OFDM symbols). The one or more conditions may include a second condition indicating that the first PUSCH message and the second PUSCH message may be simultaneously transmitted if the frequency domain resources of the first PUSCH message and the frequency domain resources of the second PUSCH message do not overlap. In some aspects, the one or more conditions may include a third condition indicating that the first PUSCH message and the second PUSCH message may be simultaneously transmitted if the frequency domain resources of the first PUSCH message and the frequency domain resources of the second PUSCH message are contiguous or adjacent. In some aspects, the one or more conditions may include a fourth condition indicating that the first PUSCH message and the second PUSCH message may be simultaneously transmitted if REs associated with the first PUSCH message fully overlap with REs associated with the second PUSCH message. The first condition, the second condition, the third condition, and the fourth condition are provided as examples of conditions associated with a resource alignment of the PUSCH messages. The condition(s) are described in more detail in connection with FIG. 5.

As shown in FIG. 6 and in example 600, the first PUSCH message and the second PUSCH message may occupy the same set of time domain resources and the same set of frequency domain resources. Therefore, the UE 120 may determine that the first condition is satisfied (e.g., because the time domain resources of the first PUSCH message and the time domain resources of the second PUSCH message fully overlap). The UE 120 may determine that the second condition is not satisfied (e.g., because the resources of the first PUSCH message and the resources of the second PUSCH message overlap in both the time domain and the frequency domain). The UE 120 may determine that the third condition is not satisfied (e.g., because the frequency domain resources of the first PUSCH message overlap with and are not contiguous with the frequency domain resources of the second PUSCH message). The UE 120 may determine that the fourth condition is satisfied (e.g., because REs associated with the first PUSCH message fully overlap with REs associated with the second PUSCH message). Therefore, if the UE 120 considers the second condition and/or the third condition (e.g., based at least in part on an RRC configuration, a UE capability, and/or a fixed rule) when determining whether to simultaneously transmit the first PUSCH message and the second PUSCH message, then the UE 120 may determine not to simultaneously transmit the first PUSCH message and the second PUSCH message. If the UE 120 does not consider the second condition and the third condition when determining whether to simultaneously transmit the first PUSCH message and the second PUSCH message, then the UE 120 may simultaneously transmit the first PUSCH message and the second PUSCH message.

As shown in example 610, the first PUSCH message may occupy a first set of frequency domain resources and the second PUSCH message may occupy a second set of frequency domain resources. The first PUSCH message and the second PUSCH message may occupy the same set of time domain resources. Therefore, the UE 120 may determine that the first condition is satisfied (e.g., because the time domain resources of the first PUSCH message and the time domain resources of the second PUSCH message fully overlap). The UE 120 may determine that the second condition is satisfied (e.g., because the resources of the first PUSCH message and the resources of the second PUSCH message do not overlap in both the time domain and the frequency domain). The UE 120 may determine that the third condition is satisfied (e.g., because the frequency domain resources of the first PUSCH message are contiguous with the frequency domain resource of the second PUSCH message). For example, as shown in FIG. 6, there no frequency domain resource (e.g., no gaps) between the first set of frequency domain resources associated with the first PUSCH message and the second set of frequency domain resources associated with the second PUSCH message. The UE 120 may determine that the fourth condition is satisfied (e.g., because there are no common REs among the first PUSCH message and the second PUSCH message). Therefore, based at least in part on the first condition, the second condition, the third condition, and the fourth condition, the UE 120 may simultaneously transmit the first PUSCH message and the second PUSCH message.

As shown in example 620, the first PUSCH message may occupy a first set of frequency domain resources and the second PUSCH message may occupy a second set of frequency domain resources. The first PUSCH message and the second PUSCH message may occupy the same set of time domain resources. Therefore, the UE 120 may determine that the first condition is satisfied (e.g., because the time domain resources of the first PUSCH message and the time domain resources of the second PUSCH message fully overlap). The UE 120 may determine that the second condition is satisfied (e.g., because the resources of the first PUSCH message and the resources of the second PUSCH message do not overlap in both the time domain and the frequency domain). The UE 120 may determine that the third condition is not satisfied (e.g., because the frequency domain resources of the first PUSCH message are not contiguous with the frequency domain resource of the second PUSCH message). For example, as shown in FIG. 6 and example 620, there are frequency domain resources (e.g., there is a gap) between the first set of frequency domain resources associated with the first PUSCH message and the second set of frequency domain resources associated with the second PUSCH message. The UE 120 may determine that the fourth condition is satisfied (e.g., because there are no common REs among the first PUSCH message and the second PUSCH message). Therefore, if the UE 120 considers the third condition (e.g., based at least in part on an RRC configuration, a UE capability, and/or a fixed rule) when determining whether to simultaneously transmit the first PUSCH message and the second PUSCH message, then the UE 120 may determine not to simultaneously transmit the first PUSCH message and the second PUSCH message. If the UE 120 does not consider the third condition when determining whether to simultaneously transmit the first PUSCH message and the second PUSCH message, then the UE 120 may simultaneously transmit the first PUSCH message and the second PUSCH message.

As shown in example 630, the first PUSCH message may occupy a first set of frequency domain resources and the second PUSCH message may occupy a second set of frequency domain resources. The first PUSCH message may occupy a first set of time domain resources and the second PUSCH message may occupy a second set of time domain resources. As shown in FIG. 6, the first set of time domain resources and the second set of time domain resources partially overlap. Therefore, the UE 120 may determine that the first condition is not satisfied (e.g., because the first set of time domain resources of the first PUSCH message and the second set of time domain resources of the second PUSCH message do not fully overlap). The UE 120 may determine that the second condition is satisfied (e.g., because the resources of the first PUSCH message and the resources of the second PUSCH message do not overlap in both the time domain and the frequency domain). The UE 120 may determine that the third condition is not satisfied (e.g., because the frequency domain resources of the first PUSCH message are not contiguous with the frequency domain resource of the second PUSCH message). For example, as shown in FIG. 6 and example 630, there are frequency domain resources (e.g., there is a gap) between the first set of frequency domain resources associated with the first PUSCH message and the second set of frequency domain resources associated with the second PUSCH message. The UE 120 may determine that the fourth condition is satisfied (e.g., because there are no common REs among the first PUSCH message and the second PUSCH message). Therefore, if the UE 120 considers the first condition and/or third condition (e.g., based at least in part on an RRC configuration, a UE capability, and/or a fixed rule) when determining whether to simultaneously transmit the first PUSCH message and the second PUSCH message, then the UE 120 may determine not to simultaneously transmit the first PUSCH message and the second PUSCH message. If the UE 120 does not consider the first condition and the third condition when determining whether to simultaneously transmit the first PUSCH message and the second PUSCH message, then the UE 120 may simultaneously transmit the first PUSCH message and the second PUSCH message.

As shown in example 640, the first PUSCH message may occupy a first set of frequency domain resources and the second PUSCH message may occupy a second set of frequency domain resources. The first PUSCH message and the second PUSCH message may occupy the same set of time domain resources. As shown in FIG. 6 and example 640, the first set of frequency domain resources may partially overlap with the second set of frequency domain resources. The UE 120 may determine that the first condition is satisfied (e.g., because the time domain resources of the first PUSCH message and the time domain resources of the second PUSCH message fully overlap). The UE 120 may determine that the second condition is not satisfied (e.g., because the resources of the first PUSCH message and the resources of the second PUSCH message overlap in both the time domain and the frequency domain). The UE 120 may determine that the third condition is not satisfied (e.g., because the frequency domain resources of the first PUSCH message overlap with, and are not contiguous with, the frequency domain resource of the second PUSCH message). The UE 120 may determine that the fourth condition is satisfied (e.g., because there are no common REs among the first PUSCH message and the second PUSCH message). Therefore, if the UE 120 considers the second condition and/or third condition (e.g., based at least in part on an RRC configuration, a UE capability, and/or a fixed rule) when determining whether to simultaneously transmit the first PUSCH message and the second PUSCH message, then the UE 120 may determine not to simultaneously transmit the first PUSCH message and the second PUSCH message. If the UE 120 does not consider the second condition and the third condition when determining whether to simultaneously transmit the first PUSCH message and the second PUSCH message, then the UE 120 may simultaneously transmit the first PUSCH message and the second PUSCH message.

As shown in example 650, the first PUSCH message may occupy a first set of time domain resources and the second PUSCH message may occupy a second set of time domain resources. The first PUSCH message and the second PUSCH message may occupy the same set of frequency domain resources. As shown in FIG. 6 and example 650, the first set of time domain resources may partially overlap with the second set of time domain resources. Therefore, the UE 120 may determine that the first condition is not satisfied (e.g., because the time domain resources of the first PUSCH message and the time domain resources of the second PUSCH message partially overlap). The UE 120 may determine that the second condition is not satisfied (e.g., because the resources of the first PUSCH message and the resources of the second PUSCH message overlap in both the time domain and the frequency domain). The UE 120 may determine that the third condition is not satisfied (e.g., because the frequency domain resources of the first PUSCH message overlap with, and are not contiguous with, the frequency domain resource of the second PUSCH message). The UE 120 may determine that the fourth condition is satisfied (e.g., because the REs associated with the first PUSCH message partially overlap with the REs associated with the second PUSCH message). Therefore, based at least in part on the first condition, the second condition, the third condition, and the fourth condition, the UE 120 may determine not to simultaneously transmit the first PUSCH message and the second PUSCH message. If the UE 120 does not consider the first condition, the second condition, the third condition, and the fourth condition when determining whether to simultaneously transmit the first PUSCH message and the second PUSCH message, then the UE 120 may simultaneously transmit the first PUSCH message and the second PUSCH message (e.g., subject to one or more other conditions, such as condition(s) associated with a DMRS alignment of the first PUSCH message and the second PUSCH message).

As indicated above, FIG. 6 is provided as an example. Other examples may differ from what is described with respect to FIG. 6.

Figure 7:
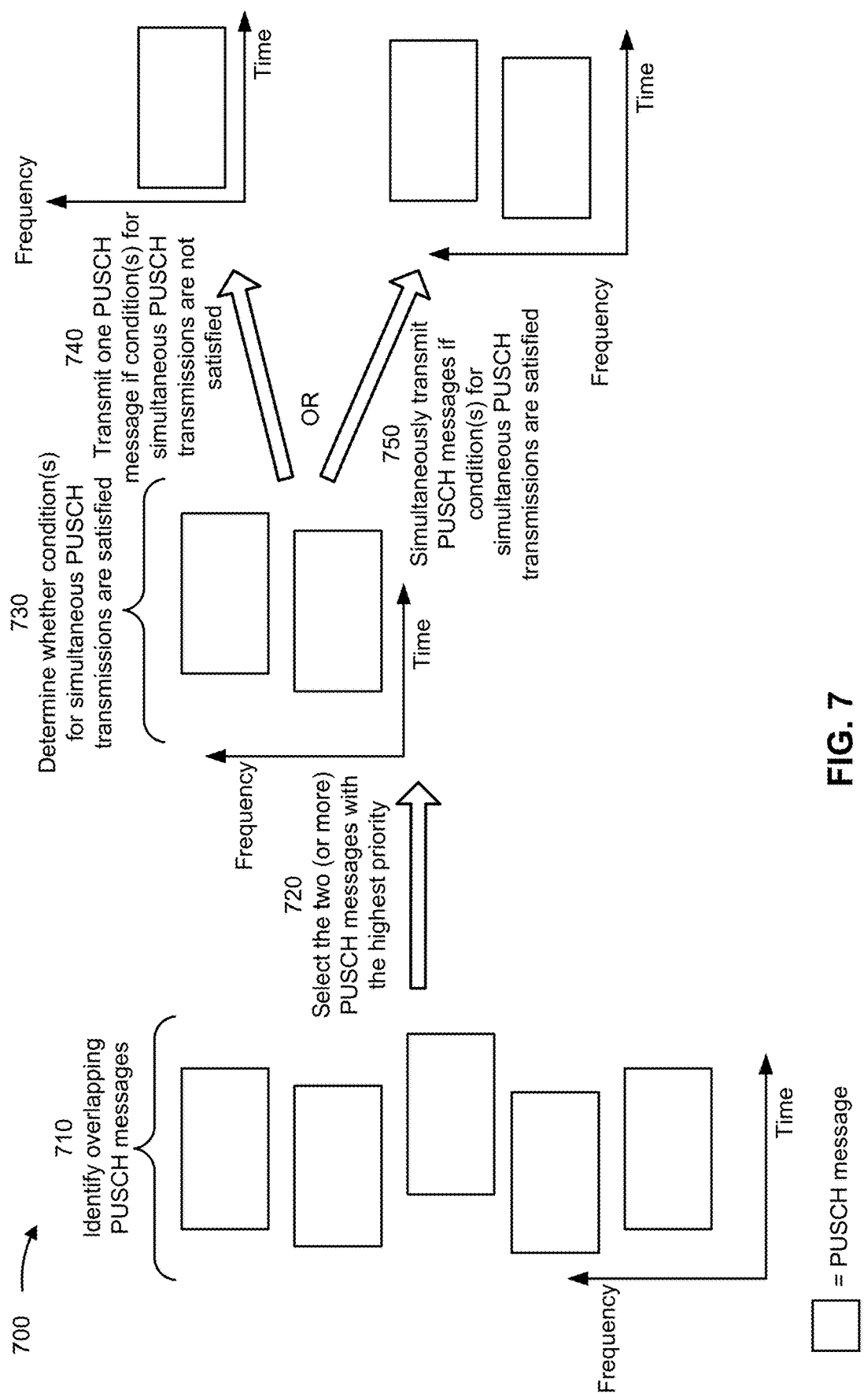
FIGS. 7 and 8 are diagrams illustrating examples associated with PUSCH message selection for simultaneous PUSCH transmissions, in accordance with the present disclosure.

FIG. 7 is a diagram illustrating an example 700 associated with PUSCH message selection for simultaneous PUSCH transmissions, in accordance with the present disclosure. FIG. 7 depicts one or more action performed by a UE 120 associated with PUSCH message selection for simultaneous PUSCH transmissions.

As shown in FIG. 7, the UE 120 may be scheduled to transmit one or more PUSCH messages. For example, the UE 120 may receive one or more uplink grants (e.g., uplink CGs and/or uplink DGs). The uplink grants may indicate resources for PUSCH messages. As shown by reference number 710, the UE 120 may identify overlapping PUSCH messages (e.g., overlapping in the time domain). For example, the UE 120 may identify two or more PUSCH messages that at least partially overlap in the time domain. As shown in FIG. 7, there may be five PUSCH messages that at least partially overlap in the time domain.

As shown by reference number 720, the UE 120 may select two (or more) PUSCH messages, from the PUSCH messages that at least partially overlap in the time domain, based at least in part on a priority associated with the PUSCH messages that at least partially overlap in the time domain. For example, the UE 120 may select the two (or more) PUSCH messages, from the PUSCH messages that at least partially overlap in the time domain, that are associated with the highest priority. In some aspects, the UE 120 may select M PUSCH messages, from the PUSCH messages that at least partially overlap in the time domain, that are associated with the highest priority, where M is the number of PUSCH messages that the UE 120 is capable of simultaneously transmitting. In some aspects, M may be two (e.g., the UE 120 may be enabled to simultaneously transmit two PUSCH messages on the same component carrier). For example, the UE 120 may compare priorities (e.g., a logical channel priority) of the PUSCH messages that at least partially overlap in the time domain. The UE 120 may select M PUSCH messages, from the PUSCH messages that at least partially overlap in the time domain, that are associated with the highest priority based on comparing the priorities of the PUSCH messages that at least partially overlap in the time domain.

As shown by reference number 730, the UE 120 may determine whether one or more conditions for simultaneous PUSCH transmissions are satisfied for the selected PUSCH messages. For example, the UE 120 may determine whether one or more conditions for simultaneous PUSCH transmissions are satisfied for the selected PUSCH messages in a similar manner as described in connection with FIGS. 5 and 6. The one or more conditions may be similar to, or the same as, the one or more conditions described in connection with FIGS. 5 and 6. For example, the one or more conditions may be associated with a resource alignment and/or a DMRS alignment of the selected PUSCH messages.

As shown by reference number 740, the UE 120 may transmit one PUSCH message, from the selected PUSCH messages, if the at least one condition for simultaneous PUSCH transmissions is not satisfied. For example, where M is two, the UE 120 may transmit one of a first PUSCH message or a second PUSCH message based on the one or more conditions not being satisfied. The UE 120 may determine which PUSCH message, from the selected PUSCH messages, to transmit based at least in part on an uplink grant type associated with the selected PUSCH messages, a priority of the selected PUSCH messages, and/or a starting location of the selected PUSCH messages, among other examples.

In some aspects, if both (or all) of the selected PUSCH messages are DG PUSCH messages, then the UE 120 may drop (e.g., not transmit, or refrain from transmitting) all of the selected PUSCH messages. For example, the UE 120 does not expect to have two or more DG PUSCH messages that do not satisfy the conditions because the DG PUSCH messages are dynamically scheduled by base station using DCI to satisfy the conditions. In other words, the base station 110 may dynamically schedule DG PUSCH messages to ensure that the one or more conditions are satisfied. Therefore, the UE 120 does not expect to be scheduled with multiple DG PUSCH messages that do not satisfy the one or more conditions. As a result, the UE 120 may drop (e.g., not transmit, or refrain from transmitting) all of the DG PUSCH messages. In other words, when both (or all) of the selected PUSCH messages are DG PUSCH messages and the one or more conditions are not satisfied, the UE 120 may determine that this is an error case and the UE 120 may drop all of the selected PUSCH messages.

In some aspects, a first PUSCH message may be a DG PUSCH message (e.g., may be dynamically scheduled by a base station 110) and a second PUSCH message may be a CG PUSCH message (e.g., may be scheduled by an uplink CG) (e.g., when M is two). In some aspects, the UE 120 may transmit the first PUSCH message (e.g., that is dynamically scheduled). The UE 120 may refrain from transmitting (e.g., drop) the second PUSCH message (e.g., that is associated with an uplink CG). In other words, when a CG PUSCH message overlaps with a DG PUSCH message and at least one condition for simultaneous PUSCH transmissions is not satisfied, the UE 120 may drop the CG PUSCH message and transmit the DG PUSCH message.

In some aspects, the first PUSCH message (e.g., that is dynamically scheduled) may be associated with a first priority and the second PUSCH message (e.g., that is associated with an uplink CG) may be associated with a second priority. The first priority and the second priority may be logical channel priorities (e.g., may be logical channel based prioritization, such as when an lch-basedPrioritization parameter is configured or enabled). The UE 120 may transmit one of the first PUSCH message or the second PUSCH message based at least in part on the first priority and the second priority. For example, the UE 120 may compare the first priority to the second priority. The UE 120 may transmit the PUSCH message, from the first PUSCH message and the second PUSCH message, with a higher priority. In other words, when a CG PUSCH message overlaps with a DG PUSCH message and at least one condition for simultaneous PUSCH transmissions is not satisfied, the UE 120 may transmit the PUSCH message that is associated with a higher priority and may refrain from transmitting (e.g., drop) the other PUSCH message.

In some aspects, the UE 120 may transmit one of the first PUSCH message or the second PUSCH message, based at least in part on a first starting location of time domain resources associated with the first PUSCH message, and/or a second starting location of time domain resources associated with the second PUSCH message. For example, the UE 120 may transmit the PUSCH message that is scheduled to occur earliest in the time domain. The UE 120 may refrain from transmitting (e.g., drop) the PUSCH message that is scheduled to occur latest in the time domain. In other words, when a CG PUSCH message overlaps with a DG PUSCH message and at least one condition for simultaneous PUSCH transmissions is not satisfied, the UE 120 may transmit the PUSCH message that is scheduled to be transmitted first in time (e.g., among the CG PUSCH message and the DG PUSCH message) and may refrain from transmitting the PUSCH message that is scheduled to be transmitted second in time.

In some aspects, both (or all) selected PUSCH messages may be associated with uplink CGs. For example, where M is two, the first PUSCH message and the second PUSCH message may be associated with uplink CGs. The UE 120 may transmit one of the first PUSCH message or the second PUSCH message based at least in part on a first group identifier associated with the first PUSCH message and a second group identifier associated with the second PUSCH message. The group identifier may be associated with a CORESET group identifier (e.g., CORESETPoolIndex parameter), a UE antenna panel identifier, an uplink beam group identifier, a sounding reference signal (SRS) resource set identifier, and/or a DMRS CDM group identifier, among other examples. For example, the UE 120 may transmit the PUSCH message that is associated with a first group identifier and may refrain from transmitting the PUSCH message that is associated with a second group identifier. A group identifier may be configured and/or indicated as "first" or "second" in a configuration (e.g., transmitted by a base station 110) or in a pre-configuration. In other words, when two CG PUSCH messages at least partially overlap in the time domain and at least one condition for simultaneous PUSCH transmissions is not satisfied, the UE 120 may transmit the PUSCH message based at least in part on group identifiers of the overlapping CG PUSCH messages.

In some aspects, the first PUSCH message may be associated with a first priority and the second PUSCH message may be associated with a second priority (e.g., when both PUSCH messages are associated with uplink CGs). The first priority and the second priority may be logical channel priorities. The UE 120 may transmit one of the first PUSCH message or the second PUSCH message based at least in part on the first priority and the second priority. The UE 120 may transmit the PUSCH message, from the first PUSCH message and the second PUSCH message, with a higher priority, in a similar manner as described in more detail elsewhere herein. In other words, when two CG PUSCH messages at least partially overlap in the time domain and at least one condition for simultaneous PUSCH transmissions is not satisfied, the UE 120 may transmit the PUSCH message that is associated with a higher priority and may refrain from transmitting (e.g., drop) the other PUSCH message.

In some aspects, the UE 120 may transmit one of the first PUSCH message or the second PUSCH message, based at least in part on a first starting location of time domain resources associated with the first PUSCH message, and/or a second starting location of time domain resources associated with the second PUSCH message in a similar manner as described in more detail elsewhere herein. For example, when two CG PUSCH messages at least partially overlap in the time domain and at least one condition for simultaneous PUSCH transmissions is not satisfied, the UE 120 may transmit the PUSCH message that is scheduled to be transmitted first in time and may refrain from transmitting the PUSCH message that is scheduled to be transmitted second in time.

In some aspects, the first PUSCH message may be associated with a first CG index and the second PUSCH message may be associated with a second CG index. The UE 120 may transmit one of the first PUSCH message or the second PUSCH message based at least in part on the first CG index associated with the first PUSCH message and the second CG index associated with the second PUSCH message. For example, the UE 120 may transmit the PUSCH message that is associated with a lower CG index (e.g., from the first CG index and the second CG index). As another example, the UE 120 may transmit the PUSCH message that is associated with a higher CG index (e.g., from the first CG index and the second CG index). In other words, when two CG PUSCH messages at least partially overlap in the time domain and at least one condition for simultaneous PUSCH transmissions is not satisfied, the UE 120 may transmit one of the two CG PUSCH messages based at least in part on CG indices associated with the CG PUSCH messages.

In some aspects, the first PUSCH message (e.g., a first uplink CG) may be associated with a first periodicity and the second PUSCH message (e.g., a second uplink CG) may be associated with a second periodicity. The UE 120 may transmit one of the first PUSCH message or the second PUSCH message based at least in part on the first periodicity and the second periodicity. For example, the UE 120 may transmit the PUSCH message that is associated with a shorter periodicity (e.g., from the first periodicity and the second periodicity). As another example, the UE 120 may transmit the PUSCH message that is associated with a longer periodicity (e.g., from the first periodicity and the second periodicity). In other words, when two CG PUSCH messages at least partially overlap in the time domain and at least one condition for simultaneous PUSCH transmissions is not satisfied, the UE 120 may transmit one of the two CG PUSCH messages based at least in part on periodicities associated with the CG PUSCH messages.

In this way, the UE 120 may be enabled to select one PUSCH message, from the selected PUSCH messages, to be transmitted by the UE 120 when at least one condition for simultaneous PUSCH transmissions is not satisfied. This may ensure that the UE 120 is enabled to transmit at least one PUSCH message when at least one condition for simultaneous PUSCH transmissions is not satisfied.

As shown by reference number 750, the UE 120 may simultaneously transmit the M selected PUSCH messages if the one or more conditions for simultaneous PUSCH transmissions are satisfied. For example, if the UE 120 determines that the one or more conditions for simultaneous PUSCH transmissions are satisfied for the M selected PUSCH messages, then the UE 120 may simultaneously transmit the M selected PUSCH messages. In other words, when the PUSCH messages that at least partially overlap in time include at least three PUSCH messages, the UE 120 may select, from the at least three PUSCH messages, a first PUSCH message and a second PUSCH message. The UE 120 may simultaneously transmit the first PUSCH message and the second PUSCH message if the one or more conditions are satisfied for the first PUSCH message and the second PUSCH message.

As indicated above, FIG. 7 is provided as an example. Other examples may differ from what is described with respect to FIG. 7.

Figure 8:
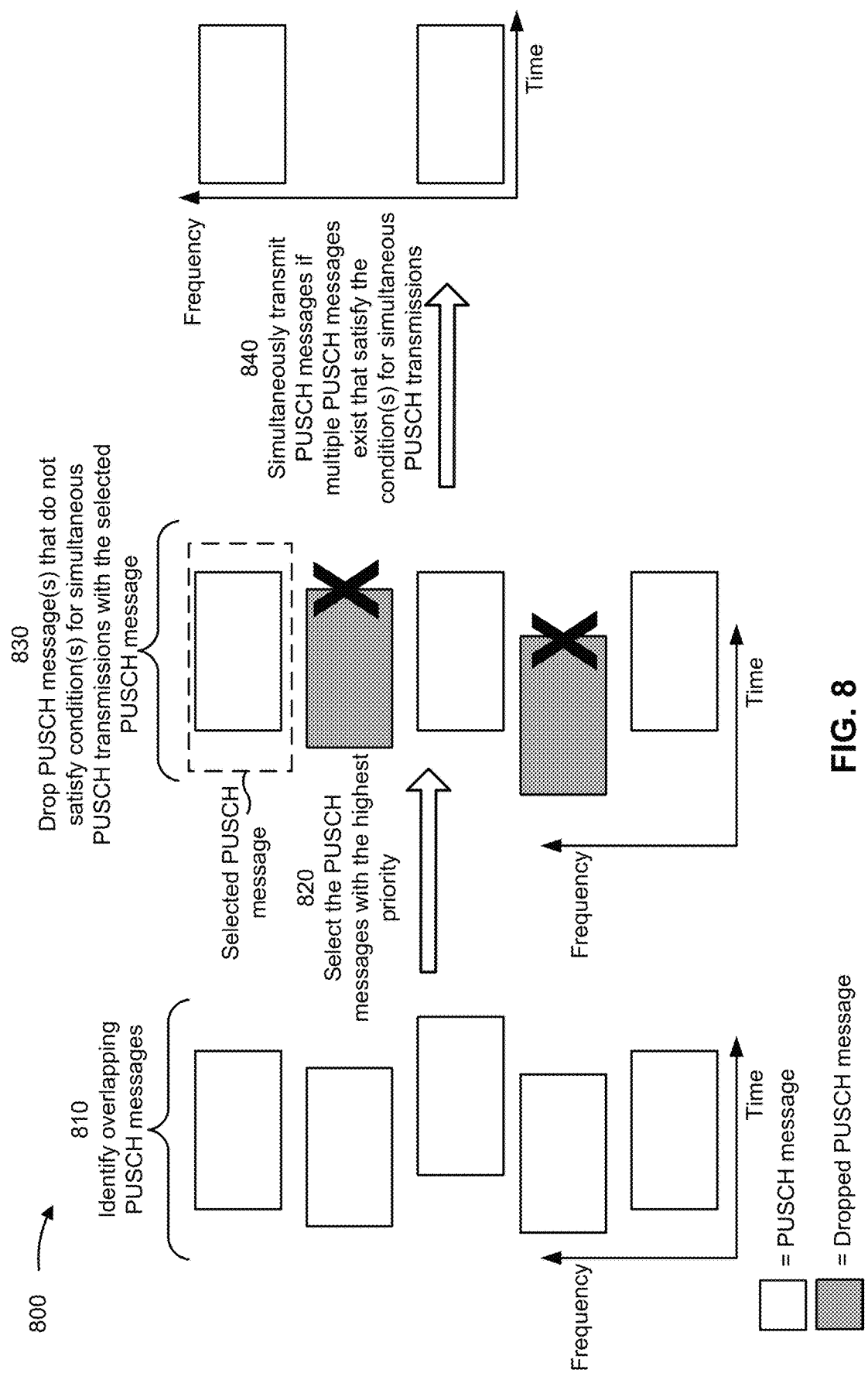

FIG. 8 is a diagram illustrating an example 800 associated with PUSCH message selection for simultaneous PUSCH transmissions, in accordance with the present disclosure. FIG. 8 depicts one or more actions performed by a UE 120 associated with PUSCH message selection for simultaneous PUSCH transmissions.

As shown in FIG. 8, the UE 120 may be scheduled to transmit one or more PUSCH messages. For example, the UE 120 may receive one or more uplink grants (e.g., uplink CGs and/or uplink DGs). The uplink grants may indicate resources for PUSCH messages. As shown by reference number 810, the UE 120 may identify overlapping PUSCH messages (e.g., overlapping in the time domain). For example, the UE 120 may identify two or more PUSCH messages that at least partially overlap in the time domain. As shown in FIG. 8, there may be five PUSCH messages that at least partially overlap in the time domain.

As shown by reference number 820, the UE 120 may select a (e.g., one) PUSCH message, from the PUSCH messages that at least partially overlap in the time domain, based at least in part on a priority associated with the PUSCH messages that at least partially overlap in the time domain. For example, the UE 120 may select the PUSCH message that is associated with the highest priority among the priorities of the PUSCH messages that at least partially overlap in the time domain. As described elsewhere herein, the priorities may be logical channel priorities.

As shown by reference number 830, the UE 120 may refrain from transmitting (e.g., drop) one or more PUSCH messages, from the PUSCH messages that at least partially overlap in the time domain, that do not satisfy at least one condition for simultaneous PUSCH transmissions with the selected PUSCH message. For example, the UE 120 may determine whether the one or more conditions are satisfied for the selected PUSCH message and all other PUSCH messages that at least partially overlap in the time domain with the selected PUSCH message (e.g., in a similar manner as described elsewhere herein). The UE 120 may refrain from transmitting (e.g., drop) each PUSCH message, from the PUSCH messages that at least partially overlap in the time domain, that do not satisfy at least one condition for simultaneous PUSCH transmissions with the selected PUSCH message. For example, as shown in FIG. 8, the UE 120 may refrain from transmitting (e.g., drop) two PUSCH messages because the PUSCH messages do not satisfy at least one condition with the selected PUSCH message.

As shown by reference number 840, the UE 120 may simultaneously transmit the selected PUSCH message and one or more (if any exist) other PUSCH messages if the one or more conditions are satisfied for the selected PUSCH message and the other PUSCH message(s). For example, the UE 120 may simultaneously transmit PUSCH messages if multiple PUSCH messages are scheduled that satisfy the condition(s) for simultaneous PUSCH transmissions. In some aspects, the UE 120 may simultaneously transmit M PUSCH messages (e.g., the selected PUSCH message and one or more other PUSCH messages), where M is the number of PUSCH messages that the UE 120 is capable of simultaneously transmitting. In some aspects, after dropping PUSCH messages, there may be more than M PUSCH messages remaining that satisfy the one or more conditions. In such examples, the UE 120 may select M PUSCH messages to be simultaneously transmitted in a similar manner as described in connection with FIG. 7 (e.g., based at least in part on priorities of the PUSCH messages, an uplink grant type of the PUSCH messages, and/or a starting time or starting location of the PUSCH messages, among other examples).

In this way, a likelihood that the UE 120 is enabled to simultaneously transmit multiple PUSCH messages is increased because the UE 120 does not drop all but M PUSCH messages prior to considering if the condition(s) for simultaneous PUSCH transmissions are satisfied. For example, if the UE 120 were to select M PUSCH messages and then determine if the condition(s) for simultaneous PUSCH transmissions are satisfied for the M PUSCH messages, the UE 120 may be unable to simultaneously transmit PUSCH messages if at least one condition is not satisfied. However, by selecting one (e.g., a single) PUSCH message and then determining if the condition(s) for simultaneous PUSCH transmissions are satisfied, a likelihood that the UE 120 is enabled to simultaneously transmit multiple PUSCH messages is increased because the UE 120 may be enabled to simultaneously transmit lower priority PUSCH messages if a higher priority PUSCH message does not satisfy a condition.

As a result, the UE 120 may be enabled to simultaneously transmit two or more PUSCH messages. This may increase a throughput of the UE 120, may increase an efficiency (e.g., a spectral efficiency) of the UE 120, may conserve resources that would have otherwise been used to retransmit one or more of the overlapping PUSCH messages, and/or may decrease a latency or delay associated with the two or more PUSCH messages, among other examples. Additionally, channel estimation performed by a receiver (e.g., a base station or a TRP) may be improved because the UE 120 may simultaneously transmit the two or more PUSCH messages based at least in part on a DMRS alignment of the two or more PUSCH messages. Moreover, the UE 120 may be enabled to determine which (if any) PUSCH message(s) are to be transmitted when the one or more conditions (described herein) are not met or satisfied for PUSCH messages that at least partially overlap in the time domain. This may reduce the quantity of PUSCH retransmissions for the UE 120, may reduce delays in the PUSCH messages, and/or may increase a likelihood of the UE 120 simultaneously transmitting PUSCH messages, among other examples.

As indicated above, FIG. 8 is provided as an example. Other examples may differ from what is described with respect to FIG. 8.

Figure 9:
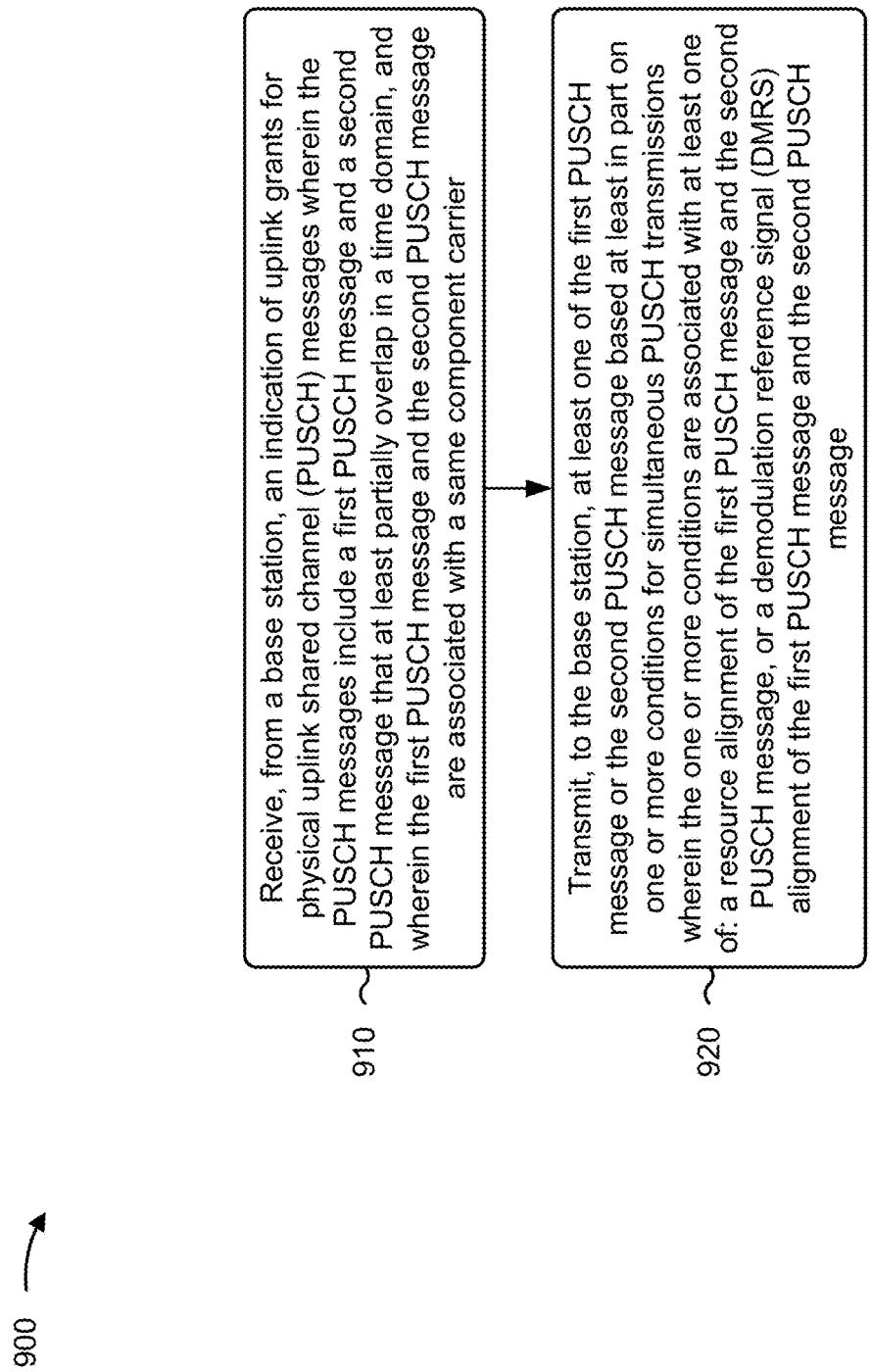
FIGS. 9 and 10 are diagrams illustrating example processes associated with conditions for simultaneous PUSCH transmissions, in accordance with the present disclosure.

FIG. 9 is a diagram illustrating an example process 900 performed, for example, by a UE, in accordance with the present disclosure. Example process 900 is an example where the UE (e.g., UE 120) performs operations associated with conditions for simultaneous PUSCH transmissions.

As shown in FIG. 9, in some aspects, process 900 may include receiving, from a base station, an indication of uplink grants for PUSCH messages, wherein the PUSCH messages include a first PUSCH message and a second PUSCH message that at least partially overlap in a time domain, and wherein the first PUSCH message and the second PUSCH message are associated with a same component carrier (block 910). For example, the UE (e.g., using communication manager 140 and/or reception component 1102, depicted in FIG. 11) may receive, from a base station, an indication of uplink grants for PUSCH messages, as described above. In some aspects, the PUSCH messages include a first PUSCH message and a second PUSCH message that at least partially overlap in a time domain. In some aspects, the first PUSCH message and the second PUSCH message are associated with a same component carrier.

As further shown in FIG. 9, in some aspects, process 900 may include transmitting, to the base station, at least one of the first PUSCH message or the second PUSCH message based at least in part on one or more conditions for simultaneous PUSCH transmissions, wherein the one or more conditions are associated with at least one of: a resource alignment of the first PUSCH message and the second PUSCH message, or a DMRS alignment of the first PUSCH message and the second PUSCH message (block 920). For example, the UE (e.g., using communication manager 140 and/or transmission component 1104, depicted in FIG. 11) may transmit, to the base station, at least one of the first PUSCH message or the second PUSCH message based at least in part on one or more conditions for simultaneous PUSCH transmissions, as described above. In some aspects, the one or more conditions are associated with at least one of: a resource alignment of the first PUSCH message and the second PUSCH message, or a DMRS alignment of the first PUSCH message and the second PUSCH message.

Process 900 may include additional aspects, such as any single aspect or any combination of aspects described below and/or in connection with one or more other processes described elsewhere herein.

In a first aspect, process 900 includes receiving, from the base station, configuration information indicating the one or more conditions.

In a second aspect, alone or in combination with the first aspect, process 900 includes transmitting, to the base station, a capability message indicating conditions supported by the UE for simultaneous PUSCH transmissions.

In a third aspect, alone or in combination with one or more of the first and second aspects, process 900 includes receiving, from the base station, configuration information indicating the one or more conditions based at least in part on transmitting the capability message.

In a fourth aspect, alone or in combination with one or more of the first through third aspects, the one or more conditions include a condition indicating that the first PUSCH message and the second PUSCH message are simultaneously transmitted based at least in part on time domain resources of the first PUSCH message fully overlapping with time domain resources of the second PUSCH message.

In a fifth aspect, alone or in combination with one or more of the first through fourth aspects, the one or more conditions include a condition indicating that the first PUSCH message and the second PUSCH message are simultaneously transmitted based at least in part on frequency domain resources of the first PUSCH message not overlapping with frequency domain resources of the second PUSCH message.

In a sixth aspect, alone or in combination with one or more of the first through fifth aspects, the one or more conditions include a condition indicating that the first PUSCH message and the second PUSCH message are simultaneously transmitted based at least in part on frequency domain resources of the first PUSCH message being contiguous with frequency domain resources of the second PUSCH message.

In a seventh aspect, alone or in combination with one or more of the first through sixth aspects, the one or more conditions include a condition indicating that the first PUSCH message and the second PUSCH message are simultaneously transmitted based at least in part on the first PUSCH message and the second PUSCH message being associated with a same one or more DMRS ports.

In an eighth aspect, alone or in combination with one or more of the first through seventh aspects, the one or more conditions include a condition indicating that the first PUSCH message and the second PUSCH message are simultaneously transmitted based at least in part on the first PUSCH message and the second PUSCH message being associated with a same one or more PUSCH ports.

In a ninth aspect, alone or in combination with one or more of the first through eighth aspects, the one or more conditions include a condition indicating that the first PUSCH message and the second PUSCH message are simultaneously transmitted based at least in part on the first PUSCH message and the second PUSCH message being associated with a same one or more power control parameters.

In a tenth aspect, alone or in combination with one or more of the first through ninth aspects, the one or more conditions include a condition indicating that the first PUSCH message and the second PUSCH message are simultaneously transmitted based at least in part on resource elements of the first PUSCH message fully overlapping with resource elements of the second PUSCH message.

In an eleventh aspect, alone or in combination with one or more of the first through tenth aspects, the one or more conditions include a condition indicating that the first PUSCH message and the second PUSCH message are simultaneously transmitted based at least in part on the first PUSCH message and the second PUSCH message being associated with at least one of a same one or more DMRS symbol locations or a same DMRS configuration type.

In a twelfth aspect, alone or in combination with one or more of the first through eleventh aspects, the one or more conditions include a condition indicating that the first PUSCH message and the second PUSCH message are simultaneously transmitted based at least in part on a first CDM group associated with the first PUSCH message being different than a second CDM group associated with the second PUSCH message.

In a thirteenth aspect, alone or in combination with one or more of the first through twelfth aspects, the one or more conditions include a condition indicating that the first PUSCH message and the second PUSCH message are simultaneously transmitted based at least in part on data associated with one PUSCH message, of the first PUSCH message and the second PUSCH message, not occupying resources associated with a DMRS CDM group of another PUSCH message of the first PUSCH message and the second PUSCH message.

In a fourteenth aspect, alone or in combination with one or more of the first through thirteenth aspects, transmitting the at least one of the first PUSCH message or the second PUSCH message includes transmitting one of the first PUSCH message or the second PUSCH message based on the one or more conditions not being satisfied.

In a fifteenth aspect, alone or in combination with one or more of the first through fourteenth aspects, the first PUSCH message or the second PUSCH is selected for transmission based at least in part on at least one of an uplink grant type associated with the first PUSCH message and the second PUSCH message, a first priority associated with the first PUSCH message and a second priority associated with the second PUSCH message, or a first starting location of time domain resources associated with the first PUSCH message and a second starting location of time domain resources associated with the second PUSCH message.

In a sixteenth aspect, alone or in combination with one or more of the first through fifteenth aspects, the one or more conditions are not satisfied, wherein the first PUSCH message is a dynamically granted PUSCH message, and wherein the second PUSCH message is a configured grant PUSCH message, and transmitting the at least one of the first PUSCH message or the second PUSCH message includes transmitting the first PUSCH message, and refraining from transmitting the second PUSCH message.

In a seventeenth aspect, alone or in combination with one or more of the first through sixteenth aspects, the one or more conditions are not satisfied, wherein the first PUSCH message is a dynamically granted PUSCH message, wherein the second PUSCH message is a configured grant PUSCH message, and wherein the first PUSCH message is associated with a first priority and the second PUSCH message is associated with a second priority, and transmitting the at least one of the first PUSCH message or the second PUSCH message includes transmitting one of the first PUSCH message or the second PUSCH message based at least in part on the first priority and the second priority.

In an eighteenth aspect, alone or in combination with one or more of the first through seventeenth aspects, the one or more conditions are not satisfied, wherein the first PUSCH message is a dynamically granted PUSCH message, wherein the second PUSCH message is a configured grant PUSCH message, and transmitting the at least one of the first PUSCH message or the second PUSCH message includes transmitting one of the first PUSCH message or the second PUSCH message, based at least in part on a first starting location of time domain resources associated with the first PUSCH message, and a second starting location of time domain resources associated with the second PUSCH message.

In a nineteenth aspect, alone or in combination with one or more of the first through eighteenth aspects, the one or more conditions are not satisfied, wherein the first PUSCH message and the second PUSCH message are configured grant PUSCH messages, and transmitting the at least one of the first PUSCH message or the second PUSCH message includes transmitting one of the first PUSCH message or the second PUSCH message based at least in part on a first group identifier associated with the first PUSCH message and a second group identifier associated with the second PUSCH message.

In a twentieth aspect, alone or in combination with one or more of the first through nineteenth aspects, the first group identifier and the second group identifier include at least one of a CORESET group identifier, a UE antenna panel identifier, an uplink beam group identifier, an SRS resource set identifier, or a DMRS CDM group identifier.

In a twenty-first aspect, alone or in combination with one or more of the first through twentieth aspects, the one or more conditions are not satisfied, wherein the first PUSCH message and the second PUSCH message are configured grant PUSCH messages, and wherein transmitting the at least one of the first PUSCH message or the second PUSCH message includes transmitting one of the first PUSCH message or the second PUSCH message based at least in part on a first configured grant index associated with the first uplink grant and a second configured grant index associated with the second uplink grant.

In a twenty-second aspect, alone or in combination with one or more of the first through twenty-first aspects, the one or more conditions are not satisfied, wherein the first PUSCH message and the second PUSCH message are configured grant PUSCH messages, and transmitting the at least one of the first PUSCH message or the second PUSCH message includes transmitting one of the first PUSCH message or the second PUSCH message based at least in part on a first periodicity associated with the first uplink grant and a second periodicity associated with the second uplink grant.

In a twenty-third aspect, alone or in combination with one or more of the first through twenty-second aspects, the PUSCH messages include at least three PUSCH messages, and process 900 includes selecting, from the at least three PUSCH messages, the first PUSCH message and the second PUSCH message, and transmitting the at least one of the first PUSCH message or the second PUSCH message includes simultaneously transmitting the first PUSCH message and the second PUSCH message if the one or more conditions are satisfied for the first PUSCH message and the second PUSCH message.

In a twenty-fourth aspect, alone or in combination with one or more of the first through twenty-third aspects, process 900 includes selecting, from the PUSCH messages, the first PUSCH message, refraining from transmitting PUSCH messages, from the PUSCH messages, that does not satisfy the one or more conditions, and transmitting the first PUSCH message and the second PUSCH message if the one or more conditions are satisfied for the first PUSCH message and the second PUSCH message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
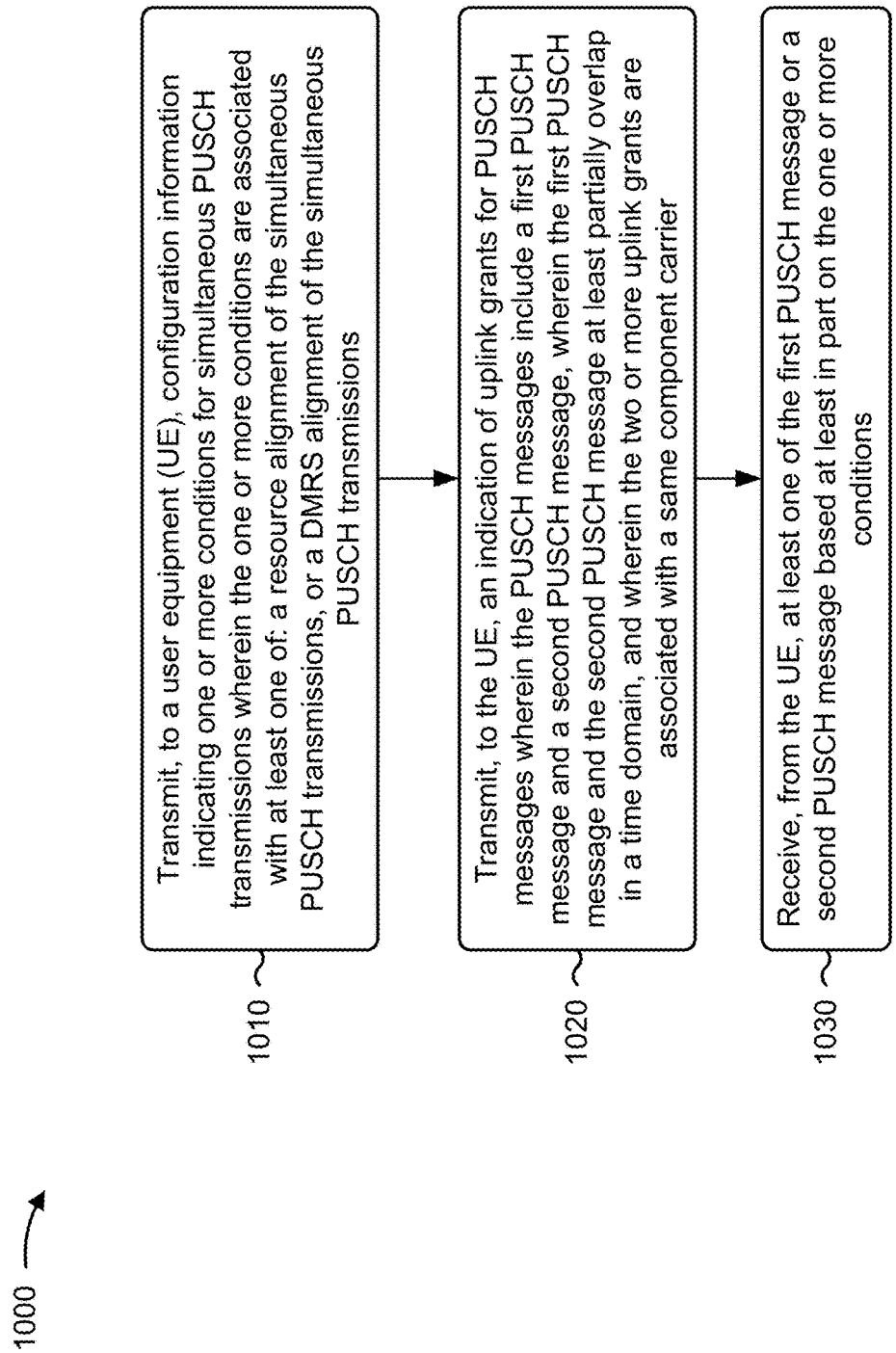

FIG. 10 is a diagram illustrating an example process 1000 performed, for example, by a base station, in accordance with the present disclosure. Example process 1000 is an example where the base station (e.g., base station 110) performs operations associated with conditions for simultaneous PUSCH transmissions.

As shown in FIG. 10, in some aspects, process 1000 may include transmitting, to a UE, configuration information indicating one or more conditions for simultaneous PUSCH transmissions, wherein the one or more conditions are associated with at least one of: a resource alignment of the simultaneous PUSCH transmissions, or a DMRS alignment of the simultaneous PUSCH transmissions (block 1010). For example, the base station (e.g., using communication manager 150 and/or transmission component 1204, depicted in FIG. 12) may transmit, to a UE, configuration information indicating one or more conditions for simultaneous PUSCH transmissions, as described above. In some aspects, the one or more conditions are associated with at least one of a resource alignment of the simultaneous PUSCH transmissions, or a DMRS alignment of the simultaneous PUSCH transmissions.

As further shown in FIG. 10, in some aspects, process 1000 may include transmitting, to the UE, an indication of uplink grants for PUSCH messages, wherein the PUSCH messages include a first PUSCH message and a second PUSCH message, wherein the first PUSCH message and the second PUSCH message at least partially overlap in a time domain, and wherein the two or more uplink grants are associated with a same component carrier (block 1020). For example, the base station (e.g., using communication manager 150 and/or transmission component 1204, depicted in FIG. 12) may transmit, to the UE, an indication of uplink grants for PUSCH messages, wherein the PUSCH messages include a first PUSCH message and a second PUSCH message, as described above. In some aspects, the PUSCH messages include a first PUSCH message and a second PUSCH message. In some aspects, the first PUSCH message and the second PUSCH message at least partially overlap in a time domain. In some aspects, the two or more uplink grants are associated with a same component carrier.

As further shown in FIG. 10, in some aspects, process 1000 may include receiving, from the UE, at least one of the first PUSCH message or a second PUSCH message based at least in part on the one or more conditions (block 1030). For example, the base station (e.g., using communication manager 150 and/or reception component 1202, depicted in FIG. 12) may receive, from the UE, at least one of the first PUSCH message or a second PUSCH message based at least in part on the one or more conditions, as described above.

Process 1000 may include additional aspects, such as any single aspect or any combination of aspects described below and/or in connection with one or more other processes described elsewhere herein.

In a first aspect, process 1000 includes receiving, from the UE, a capability message indicating conditions supported by the UE for simultaneous PUSCH transmissions.

In a second aspect, alone or in combination with the first aspect, the one or more conditions for simultaneous PUSCH transmissions are based at least in part on the conditions indicated by the capability message.

In a third aspect, alone or in combination with one or more of the first and second aspects, the one or more conditions include a condition indicating that the first PUSCH message and the second PUSCH message are simultaneously transmitted based at least in part on time domain resources of the first PUSCH message fully overlapping with time domain resources of the second PUSCH message.

In a fourth aspect, alone or in combination with one or more of the first through third aspects, the one or more conditions include a condition indicating that the first PUSCH message and the second PUSCH message are simultaneously transmitted based at least in part on frequency domain resources of the first PUSCH message not overlapping with frequency domain resources of the second PUSCH message.

In a fifth aspect, alone or in combination with one or more of the first through fourth aspects, the one or more conditions include a condition indicating that the first PUSCH message and the second PUSCH message are simultaneously transmitted based at least in part on frequency domain resources of the first PUSCH message being contiguous with frequency domain resources of the second PUSCH message.

In a sixth aspect, alone or in combination with one or more of the first through fifth aspects, the one or more conditions include a condition indicating that the first PUSCH message and the second PUSCH message are simultaneously transmitted based at least in part on the first PUSCH message and the second PUSCH message being associated with a same one or more DMRS ports.

In a seventh aspect, alone or in combination with one or more of the first through sixth aspects, the one or more conditions include a condition indicating that the first PUSCH message and the second PUSCH message are simultaneously transmitted based at least in part on the first PUSCH message and the second PUSCH message being associated with a same one or more PUSCH ports.

In an eighth aspect, alone or in combination with one or more of the first through seventh aspects, the one or more conditions include a condition indicating that the first PUSCH message and the second PUSCH message are simultaneously transmitted based at least in part on the first PUSCH message and the second PUSCH message being associated with a same one or more power control parameters.

In a ninth aspect, alone or in combination with one or more of the first through eighth aspects, the one or more conditions include a condition indicating that the first PUSCH message and the second PUSCH message are simultaneously transmitted based at least in part on resource elements of the first PUSCH message fully overlapping with resource elements of the second PUSCH message.

In a tenth aspect, alone or in combination with one or more of the first through ninth aspects, the one or more conditions include a condition indicating that the first PUSCH message and the second PUSCH message are simultaneously transmitted based at least in part on the first PUSCH message and the second PUSCH message being associated with at least one of a same one or more DMRS symbol locations or a same DMRS configuration type.

In an eleventh aspect, alone or in combination with one or more of the first through tenth aspects, the one or more conditions include a condition indicating that the first PUSCH message and the second PUSCH message are simultaneously transmitted based at least in part on a first code CDM group associated with the first PUSCH message being different than a second CDM group associated with the second PUSCH message.

In a twelfth aspect, alone or in combination with one or more of the first through eleventh aspects, the one or more conditions include a condition indicating that the first PUSCH message and the second PUSCH message are simultaneously transmitted based at least in part on data associated with one PUSCH message, of the first PUSCH message and the second PUSCH message, not occupying resources associated with a DMRS CDM group of another PUSCH message of the first PUSCH message and the second PUSCH message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
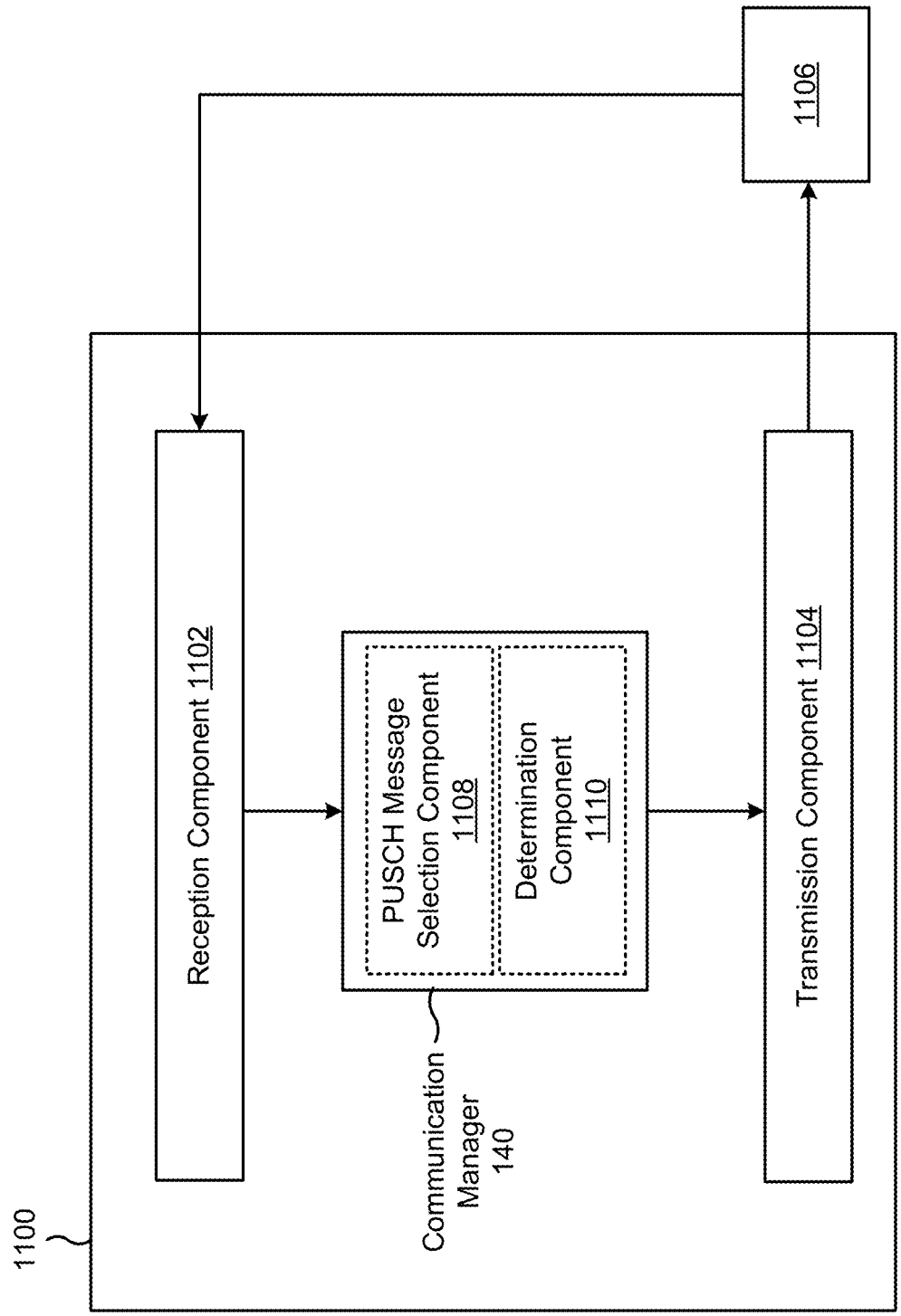
FIGS. 11 and 12 are diagrams of example apparatuses for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a PUSCH message selection component 1108, and/or a determination component 1110, among other examples.

In some aspects, the apparatus 1100 may be configured to perform one or more operations described herein in connection with FIGS. 5-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a base station, an indication of uplink grants for PUSCH messages, wherein the PUSCH messages include a first PUSCH message and a second PUSCH message that at least partially overlap in a time domain, and wherein the first PUSCH message and the second PUSCH message are associated with a same component carrier. The transmission component 1104 may transmit, to the base station, at least one of the first PUSCH message or the second PUSCH message based at least in part on one or more conditions for simultaneous PUSCH transmissions, wherein the one or more conditions are associated with at least one of: a resource alignment of the first PUSCH message and the second PUSCH message, or a DMRS alignment of the first PUSCH message and the second PUSCH message.

The reception component 1102 may receive, from the base station, configuration information indicating the one or more conditions.

The transmission component 1104 may transmit, to the base station, a capability message indicating conditions supported by the UE for simultaneous PUSCH transmissions.

The reception component 1102 may receive, from the base station, configuration information indicating the one or more conditions based at least in part on transmitting the capability message.

The PUSCH message selection component 1108 may select, from the PUSCH messages, the first PUSCH message.

The determination component 1110 may refrain from transmitting PUSCH messages, from the PUSCH messages, that does not satisfy the one or more conditions.

The transmission component 1104 may transmit the first PUSCH message and the second PUSCH message if the one or more conditions are satisfied for the first PUSCH message and the second PUSCH message.

The determination component 1110 may determine whether the one or more conditions are satisfied for the first PUSCH message and the second PUSCH message.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
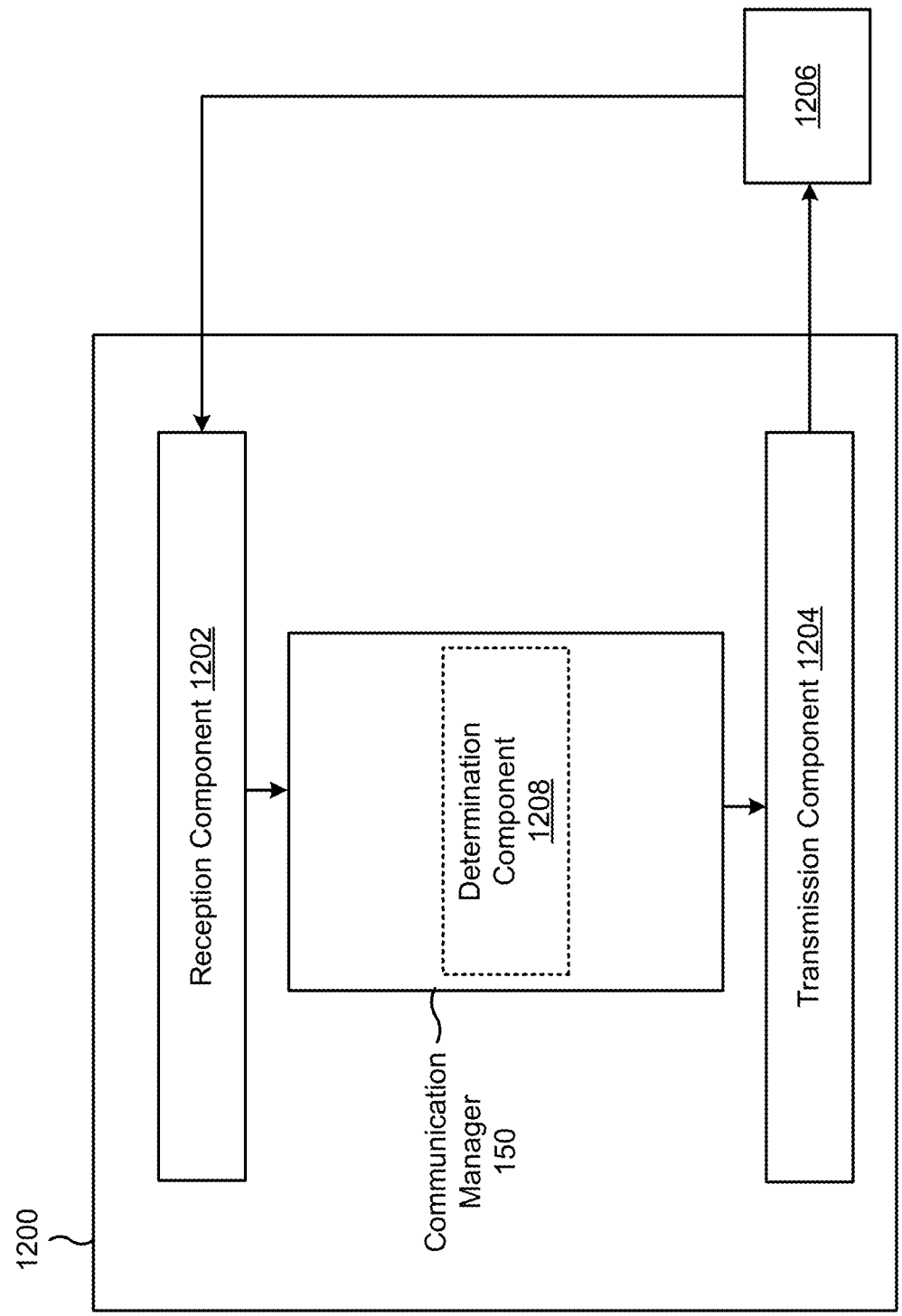

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a determination component 1208, among other examples.

In some aspects, the apparatus 1200 may be configured to perform one or more operations described herein in connection with FIGS. 5-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The transmission component 1204 may transmit, to a UE, configuration information indicating one or more conditions for simultaneous PUSCH transmissions, wherein the one or more conditions are associated with at least one of: a resource alignment of the simultaneous PUSCH transmissions, or a DMRS alignment of the simultaneous PUSCH transmissions. The transmission component 1204 may transmit, to the UE, an indication of uplink grants for PUSCH messages, wherein the PUSCH messages include a first PUSCH message and a second PUSCH message, wherein the first PUSCH message and the second PUSCH message at least partially overlap in a time domain, and wherein the two or more uplink grants are associated with a same component carrier. The reception component 1202 may receive, from the UE, at least one of the first PUSCH message or a second PUSCH message based at least in part on the one or more conditions.

The reception component 1202 may receive, from the UE, a capability message indicating conditions supported by the UE for simultaneous PUSCH transmissions.

The determination component 1208 may determine the one or more conditions based at least in part on the conditions supported by the UE for simultaneous PUSCH transmissions.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a base station, an indication of uplink grants for physical uplink shared channel (PUSCH) messages, wherein the PUSCH messages include a first PUSCH message and a second PUSCH message that at least partially overlap in a time domain, and wherein the first PUSCH message and the second PUSCH message are associated with a same component carrier; and transmitting, to the base station, at least one of the first PUSCH message or the second PUSCH message based at least in part on one or more conditions for simultaneous PUSCH transmissions, wherein the one or more conditions are associated with at least one of: a resource alignment of the first PUSCH message and the second PUSCH message, or a demodulation reference signal (DMRS) alignment of the first PUSCH message and the second PUSCH message.

Aspect 2: The method of Aspect 1, further comprising: receiving, from the base station, configuration information indicating the one or more conditions.

Aspect 3: The method of any of Aspects 1-2, further comprising: transmitting, to the base station, a capability message indicating conditions supported by the UE for simultaneous PUSCH transmissions.

Aspect 4: The method of Aspect 3, further comprising: receiving, from the base station, configuration information indicating the one or more conditions based at least in part on transmitting the capability message.

Aspect 5: The method of any of Aspects 1-4, wherein the one or more conditions include a condition indicating that the first PUSCH message and the second PUSCH message are simultaneously transmitted based at least in part on time domain resources of the first PUSCH message fully overlapping with time domain resources of the second PUSCH message.

Aspect 6: The method of any of Aspects 1-5, wherein the one or more conditions include a condition indicating that the first PUSCH message and the second PUSCH message are simultaneously transmitted based at least in part on frequency domain resources of the first PUSCH message not overlapping with frequency domain resources of the second PUSCH message.

Aspect 7: The method of any of Aspects 1-6, wherein the one or more conditions include a condition indicating that the first PUSCH message and the second PUSCH message are simultaneously transmitted based at least in part on frequency domain resources of the first PUSCH message being contiguous with frequency domain resources of the second PUSCH message.

Aspect 8: The method of any of Aspects 1-7, wherein the one or more conditions include a condition indicating that the first PUSCH message and the second PUSCH message are simultaneously transmitted based at least in part on the first PUSCH message and the second PUSCH message being associated with a same one or more DMRS ports.

Aspect 9: The method of any of Aspects 1-8, wherein the one or more conditions include a condition indicating that the first PUSCH message and the second PUSCH message are simultaneously transmitted based at least in part on the first PUSCH message and the second PUSCH message being associated with a same one or more PUSCH ports.

Aspect 10: The method of any of Aspects 1-9, wherein the one or more conditions include a condition indicating that the first PUSCH message and the second PUSCH message are simultaneously transmitted based at least in part on the first PUSCH message and the second PUSCH message being associated with a same one or more power control parameters.

Aspect 11: The method of any of Aspects 1-10, wherein the one or more conditions include a condition indicating that the first PUSCH message and the second PUSCH message are simultaneously transmitted based at least in part on resource elements of the first PUSCH message fully overlapping with resource elements of the second PUSCH message.

Aspect 12: The method of any of Aspects 1-11, wherein the one or more conditions include a condition indicating that the first PUSCH message and the second PUSCH message are simultaneously transmitted based at least in part on the first PUSCH message and the second PUSCH message being associated with at least one of a same one or more DMRS symbol locations or a same DMRS configuration type.

Aspect 13: The method of any of Aspects 1-12, wherein the one or more conditions include a condition indicating that the first PUSCH message and the second PUSCH message are simultaneously transmitted based at least in part on a first code division multiplex (CDM) group associated with the first PUSCH message being different than a second CDM group associated with the second PUSCH message.

Aspect 14: The method of any of Aspects 1-13, wherein the one or more conditions include a condition indicating that the first PUSCH message and the second PUSCH message are simultaneously transmitted based at least in part on data associated with one PUSCH message, of the first PUSCH message and the second PUSCH message, not occupying resources associated with a DMRS code division multiplex (CDM) group of another PUSCH message of the first PUSCH message and the second PUSCH message.

Aspect 15: The method of any of Aspects 1-14, wherein transmitting the at least one of the first PUSCH message or the second PUSCH message comprises: transmitting one of the first PUSCH message or the second PUSCH message based on the one or more conditions not being satisfied.

Aspect 16: The method of Aspect 15, wherein the first PUSCH message or the second PUSCH is selected for transmission based at least in part on at least one of: an uplink grant type associated with the first PUSCH message and the second PUSCH message, a first priority associated with the first PUSCH message and a second priority associated with the second PUSCH message, or a first starting location of time domain resources associated with the first PUSCH message and a second starting location of time domain resources associated with the second PUSCH message.

Aspect 17: The method of any of Aspects 1-16, wherein, based at least in part on the one or more conditions not being satisfied, the first PUSCH message being a dynamically granted PUSCH message, and the second PUSCH message being a configured grant PUSCH message, transmitting the at least one of the first PUSCH message or the second PUSCH message comprises: transmitting the first PUSCH message; and refraining from transmitting the second PUSCH message.

Aspect 18: The method of any of Aspects 1-17, wherein, based at least in part on the one or more conditions not being satisfied, the first PUSCH message being a dynamically granted PUSCH message, the second PUSCH message being a configured grant PUSCH message, and the first PUSCH message being associated with a first priority and the second PUSCH message being associated with a second priority, transmitting the at least one of the first PUSCH message or the second PUSCH message comprises: transmitting one of the first PUSCH message or the second PUSCH message based at least in part on the first priority and the second priority.

Aspect 19: The method of any of Aspects 1-18, wherein, based at least in part on the one or more conditions not being satisfied, the first PUSCH message being a dynamically granted PUSCH message, and the second PUSCH message being a configured grant PUSCH message, transmitting the at least one of the first PUSCH message or the second PUSCH message comprises: transmitting one of the first PUSCH message or the second PUSCH message, based at least in part on a first starting location of time domain resources associated with the first PUSCH message, and a second starting location of time domain resources associated with the second PUSCH message.

Aspect 20: The method of any of Aspects 1-16, wherein, based at least in part on the one or more conditions not being satisfied, and the first PUSCH message and the second PUSCH message being configured grant PUSCH messages, transmitting the at least one of the first PUSCH message or the second PUSCH message comprises: transmitting one of the first PUSCH message or the second PUSCH message based at least in part on a first group identifier associated with the first PUSCH message and a second group identifier associated with the second PUSCH message.

Aspect 21: The method of Aspect 20, wherein the first group identifier and the second group identifier include at least one of: a control resource set (CORESET) group identifier, a UE antenna panel identifier, an uplink beam group identifier, a sounding reference signal (SRS) resource set identifier, or a DMRS code division multiplex (CDM) group identifier.

Aspect 22: The method of any of Aspects 1-16 and 20-21, wherein, based at least in part on the one or more conditions not being satisfied, and the first PUSCH message and the second PUSCH message being configured grant PUSCH messages, transmitting the at least one of the first PUSCH message or the second PUSCH message comprises: transmitting one of the first PUSCH message or the second PUSCH message based at least in part on a first configured grant index associated with the first uplink grant and a second configured grant index associated with the second uplink grant.

Aspect 23: The method of any of Aspects 1-16 and 20-22, wherein, based at least in part on the one or more conditions not being satisfied, and the first PUSCH message and the second PUSCH message being configured grant PUSCH messages, transmitting the at least one of the first PUSCH message or the second PUSCH message comprises: transmitting one of the first PUSCH message or the second PUSCH message based at least in part on a first periodicity associated with the first uplink grant and a second periodicity associated with the second uplink grant.

Aspect 24: The method of any of Aspects 1-23, wherein the PUSCH messages include at least three PUSCH messages, wherein the method further comprises: selecting, from the at least three PUSCH messages, the first PUSCH message and the second PUSCH message; and wherein transmitting the at least one of the first PUSCH message or the second PUSCH message comprises: simultaneously transmitting the first PUSCH message and the second PUSCH message if the one or more conditions are satisfied for the first PUSCH message and the second PUSCH message.

Aspect 25: The method of any of Aspects 1-23, further comprising: selecting, from the PUSCH messages, the first PUSCH message; refraining from transmitting PUSCH messages, from the PUSCH messages, that does not satisfy the one or more conditions; and transmitting the first PUSCH message and the second PUSCH message if the one or more conditions are satisfied for the first PUSCH message and the second PUSCH message.

Aspect 26: The method of any of Aspects 1-25, wherein the one or more conditions are associated with the resource alignment of the first PUSCH message and the second PUSCH message, and wherein the one or more conditions include at least one of: a first condition indicating that the first PUSCH message and the second PUSCH message are simultaneously transmitted based at least in part on time domain resources of the first PUSCH message fully overlapping with time domain resources of the second PUSCH message; a second condition indicating that the first PUSCH message and the second PUSCH message are simultaneously transmitted based at least in part on frequency domain resources of the first PUSCH message not overlapping with frequency domain resources of the second PUSCH message; a third condition indicating that the first PUSCH message and the second PUSCH message are simultaneously transmitted based at least in part on frequency domain resources of the first PUSCH message being contiguous with frequency domain resources of the second PUSCH message; or a fourth condition indicating that the first PUSCH message and the second PUSCH message are simultaneously transmitted based at least in part on resource elements of the first PUSCH message fully overlapping with resource elements of the second PUSCH message.

Aspect 27: The method of any of Aspects 1-26, wherein the one or more conditions are associated with the DMRS alignment of the first PUSCH message and the second PUSCH message, and wherein the one or more conditions include at least one of: a first condition indicating that the first PUSCH message and the second PUSCH message are simultaneously transmitted based at least in part on the first PUSCH message and the second PUSCH message being associated with at least one of a same one or more DMRS symbol locations or a same DMRS configuration type; a second condition indicating that the first PUSCH message and the second PUSCH message are simultaneously transmitted based at least in part on a first code division multiplex (CDM) group associated with the first PUSCH message being different than a second CDM group associated with the second PUSCH message; or a third condition indicating that the first PUSCH message and the second PUSCH message are simultaneously transmitted based at least in part on data associated with one PUSCH message, of the first PUSCH message and the second PUSCH message, not occupying resources associated with a DMRS CDM group of another PUSCH message of the first PUSCH message and the second PUSCH message.

Aspect 28: A method of wireless communication performed by a base station, comprising: transmitting, to a user equipment (UE), configuration information indicating one or more conditions for simultaneous physical uplink shared channel (PUSCH) transmissions, wherein the one or more conditions are associated with at least one of: a resource alignment of the simultaneous PUSCH transmissions, or a demodulation reference signal (DMRS) alignment of the simultaneous PUSCH transmissions; transmitting, to the UE, an indication of uplink grants for PUSCH messages, wherein the PUSCH messages include a first PUSCH message and a second PUSCH message, wherein the first PUSCH message and the second PUSCH message at least partially overlap in a time domain, and wherein the two or more uplink grants are associated with a same component carrier; and receiving, from the UE, at least one of the first PUSCH message or a second PUSCH message based at least in part on the one or more conditions.

Aspect 29: The method of Aspect 28, further comprising: receiving, from the UE, a capability message indicating conditions supported by the UE for simultaneous PUSCH transmissions.

Aspect 30: The method of Aspect 29, wherein the one or more conditions for simultaneous PUSCH transmissions are based at least in part on the conditions indicated by the capability message.

Aspect 31: The method of any of Aspects 28-30, wherein the one or more conditions include a condition indicating that the first PUSCH message and the second PUSCH message are simultaneously transmitted based at least in part on time domain resources of the first PUSCH message fully overlapping with time domain resources of the second PUSCH message.

Aspect 32: The method of any of Aspects 28-31, wherein the one or more conditions include a condition indicating that the first PUSCH message and the second PUSCH message are simultaneously transmitted based at least in part on frequency domain resources of the first PUSCH message not overlapping with frequency domain resources of the second PUSCH message.

Aspect 33: The method of any of Aspects 28-32, wherein the one or more conditions include a condition indicating that the first PUSCH message and the second PUSCH message are simultaneously transmitted based at least in part on frequency domain resources of the first PUSCH message being contiguous with frequency domain resources of the second PUSCH message.

Aspect 34: The method of any of Aspects 28-33, wherein the one or more conditions include a condition indicating that the first PUSCH message and the second PUSCH message are simultaneously transmitted based at least in part on the first PUSCH message and the second PUSCH message being associated with a same one or more DMRS ports.

Aspect 35: The method of any of Aspects 28-34, wherein the one or more conditions include a condition indicating that the first PUSCH message and the second PUSCH message are simultaneously transmitted based at least in part on the first PUSCH message and the second PUSCH message being associated with a same one or more PUSCH ports.

Aspect 36: The method of any of Aspects 28-35, wherein the one or more conditions include a condition indicating that the first PUSCH message and the second PUSCH message are simultaneously transmitted based at least in part on the first PUSCH message and the second PUSCH message being associated with a same one or more power control parameters.

Aspect 37: The method of any of Aspects 28-36, wherein the one or more conditions include a condition indicating that the first PUSCH message and the second PUSCH message are simultaneously transmitted based at least in part on resource elements of the first PUSCH message fully overlapping with resource elements of the second PUSCH message.

Aspect 38: The method of any of Aspects 28-37, wherein the one or more conditions include a condition indicating that the first PUSCH message and the second PUSCH message are simultaneously transmitted based at least in part on the first PUSCH message and the second PUSCH message being associated with at least one of a same one or more DMRS symbol locations or a same DMRS configuration type.

Aspect 39: The method of any of Aspects 28-38, wherein the one or more conditions include a condition indicating that the first PUSCH message and the second PUSCH message are simultaneously transmitted based at least in part on a first code division multiplex (CDM) group associated with the first PUSCH message being different than a second CDM group associated with the second PUSCH message.

Aspect 40: The method of any of Aspects 28-39, wherein the one or more conditions include a condition indicating that the first PUSCH message and the second PUSCH message are simultaneously transmitted based at least in part on data associated with one PUSCH message, of the first PUSCH message and the second PUSCH message, not occupying resources associated with a DMRS code division multiplex (CDM) group of another PUSCH message of the first PUSCH message and the second PUSCH message.

Aspect 41: An apparatus for wireless communication at a device, comprising a processor; memory coupled with the processor; and instructions stored in the memory and executable by the processor to cause the apparatus to perform the method of one or more of Aspects 1-27.

Aspect 42: A device for wireless communication, comprising a memory and one or more processors coupled to the memory, the one or more processors configured to perform the method of one or more of Aspects 1-27.

Aspect 43: An apparatus for wireless communication, comprising at least one means for performing the method of one or more of Aspects 1-27.

Aspect 44: A non-transitory computer-readable medium storing code for wireless communication, the code comprising instructions executable by a processor to perform the method of one or more of Aspects 1-27.

Aspect 45: A non-transitory computer-readable medium storing a set of instructions for wireless communication, the set of instructions comprising one or more instructions that, when executed by one or more processors of a device, cause the device to perform the method of one or more of Aspects 1-27.

Aspect 46: An apparatus for wireless communication at a device, comprising a processor; memory coupled with the processor; and instructions stored in the memory and executable by the processor to cause the apparatus to perform the method of one or more of Aspects 28-40.

Aspect 47: A device for wireless communication, comprising a memory and one or more processors coupled to the memory, the one or more processors configured to perform the method of one or more of Aspects 28-40.

Aspect 48: An apparatus for wireless communication, comprising at least one means for performing the method of one or more of Aspects 28-40.

Aspect 49: A non-transitory computer-readable medium storing code for wireless communication, the code comprising instructions executable by a processor to perform the method of one or more of Aspects 28-40.

Aspect 50: A non-transitory computer-readable medium storing a set of instructions for wireless communication, the set of instructions comprising one or more instructions that, when executed by one or more processors of a device, cause the device to perform the method of one or more of Aspects 28-40.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
transmit an indication of a UE capability of one or more conditions associated with performing simultaneous transmission of physical uplink shared channel (PUSCH) transmissions, wherein the one or more conditions indicate that the PUSCH transmissions at least partially overlap in a time domain;
receive an indication of uplink grants for a first PUSCH message and a second PUSCH message that at least partially overlap in the time domain; and
transmit the first PUSCH message and the second PUSCH message based at least in part on the one or more conditions associated with performing simultaneous transmission of the PUSCH transmissions being satisfied.

2. The UE of claim 1, wherein the first PUSCH message and the second PUSCH message at least partially overlap in a frequency domain.

3. The UE of claim 1, wherein the first PUSCH message and the second PUSCH message are associated with a same component carrier.

4. The UE of claim 1, wherein the simultaneous transmission of the PUSCH transmissions includes transmission of two or more PUSCH messages via at least one symbol that is common to the two or more PUSCH messages.

5. The UE of claim 1, wherein the one or more conditions are associated with a resource alignment of the first PUSCH message and the second PUSCH message, and wherein the one or more conditions include at least one of:
a first condition indicating that the first PUSCH message and the second PUSCH message are simultaneously transmitted based at least in part on time domain resources of the first PUSCH message fully overlapping with time domain resources of the second PUSCH message;
a second condition indicating that the first PUSCH message and the second PUSCH message are simultaneously transmitted based at least in part on frequency domain resources of the first PUSCH message not overlapping with frequency domain resources of the second PUSCH message;
a third condition indicating that the first PUSCH message and the second PUSCH message are simultaneously transmitted based at least in part on frequency domain resources of the first PUSCH message being contiguous with frequency domain resources of the second PUSCH message; or a fourth condition indicating that the first PUSCH message and the second PUSCH message are simultaneously transmitted based at least in part on resource elements of the first PUSCH message fully overlapping with resource elements of the second PUSCH message.

6. The UE of claim 1, wherein the one or more processors are further configured to:
receive configuration information indicating the one or more conditions.

7. The UE of claim 1, wherein the one or more processors are further configured to:
select, from at least three PUSCH messages, the first PUSCH message and the second PUSCH message; and
wherein the one or more processors, to transmit the first PUSCH message and the second PUSCH message, are configured to:
simultaneously transmit the first PUSCH message and the second PUSCH message.

8. The UE of claim 1, wherein the one or more processors are further configured to:
select, from a set of PUSCH messages, the first PUSCH message; and
refrain from transmitting PUSCH messages, from the set of PUSCH messages, that do not satisfy the one or more conditions.

9. A network entity for wireless communication, comprising:
a memory; and
one or more processors, coupled to the memory, configured to:
receive an indication of a user equipment (UE) capability of one or more conditions associated with performing simultaneous transmission of physical uplink shared channel (PUSCH) transmissions,
wherein the one or more conditions indicate that the PUSCH transmissions at least partially overlap in a time domain;
transmit an indication of uplink grants for a first PUSCH message and a second PUSCH message that at least partially overlap in the time domain; and
receive the first PUSCH message and the second PUSCH message based at least in part on the one or more conditions associated with performing simultaneous transmission of the PUSCH transmissions being satisfied.

10. The network entity of claim 9, wherein the first PUSCH message and the second PUSCH message at least partially overlap in a frequency domain.

11. The network entity of claim 9, wherein the first PUSCH message and the second PUSCH message are associated with a same component carrier.

12. The network entity of claim 9, wherein the simultaneous transmission of the PUSCH transmissions includes transmission of two or more PUSCH messages via at least one symbol that is common to the two or more PUSCH messages.

13. The network entity of claim 9, wherein the one or more conditions are associated with a resource alignment of the first PUSCH message and the second PUSCH message, and wherein the one or more conditions include at least one of:
a first condition indicating that the first PUSCH message and the second PUSCH message are simultaneously transmitted based at least in part on time domain resources of the first PUSCH message fully overlapping with time domain resources of the second PUSCH message;

a second condition indicating that the first PUSCH message and the second PUSCH message are simultaneously transmitted based at least in part on frequency domain resources of the first PUSCH message not overlapping with frequency domain resources of the second PUSCH message;

a third condition indicating that the first PUSCH message and the second PUSCH message are simultaneously transmitted based at least in part on frequency domain resources of the first PUSCH message being contiguous with frequency domain resources of the second PUSCH message; or a fourth condition indicating that the first PUSCH message and the second PUSCH message are simultaneously transmitted based at least in part on resource elements of the first PUSCH message fully overlapping with resource elements of the second PUSCH message.

14. The network entity of claim 9, wherein the one or more processors are further configured to:

transmit configuration information indicating the one or more conditions.

15. A method of wireless communication performed by a user equipment (UE), comprising:

transmitting an indication of a UE capability of one or more conditions associated with performing simultaneous transmission of physical uplink shared channel (PUSCH) transmissions,
wherein the one or more conditions indicate that the PUSCH transmissions at least partially overlap in a time domain;

receiving an indication of uplink grants for a first PUSCH message and a second PUSCH message that at least partially overlap in the time domain; and transmitting the first PUSCH message and the second PUSCH message based at least in part on the one or more conditions associated with performing simultaneous transmission of the PUSCH transmissions being satisfied.

16. The method of claim 15, wherein the first PUSCH message and the second PUSCH message at least partially overlap in a frequency domain.

17. The method of claim 15, wherein the first PUSCH message and the second PUSCH message are associated with a same component carrier.

18. The method of claim 15, wherein the simultaneous transmission of the PUSCH transmissions includes transmission of two or more PUSCH messages via at least one symbol that is common to the two or more PUSCH messages.

19. The method of claim 15, wherein the one or more conditions are associated with a resource alignment of the first PUSCH message and the second PUSCH message, and wherein the one or more conditions include at least one of:

a first condition indicating that the first PUSCH message and the second PUSCH message are simultaneously transmitted based at least in part on time domain resources of the first PUSCH message fully overlapping with time domain resources of the second PUSCH message;

a second condition indicating that the first PUSCH message and the second PUSCH message are simultaneously transmitted based at least in part on frequency domain resources of the first PUSCH message not overlapping with frequency domain resources of the second PUSCH message;

a third condition indicating that the first PUSCH message and the second PUSCH message are simultaneously transmitted based at least in part on frequency domain resources of the first PUSCH message being contiguous with frequency domain resources of the second PUSCH message; or a fourth condition indicating that the first PUSCH message and the second PUSCH message are simultaneously transmitted based at least in part on resource elements of the first PUSCH message fully overlapping with resource elements of the second PUSCH message.

20. The method of claim 15, further comprising:

receiving configuration information indicating the one or more conditions.

* * * * *